US011065996B2

(12) United States Patent
Ito

(10) Patent No.: US 11,065,996 B2
(45) Date of Patent: Jul. 20, 2021

(54) VEHICLE SEAT

(71) Applicant: TOYOTA BOSHOKU KABUSHIKI KAISHA, Aichi-ken (JP)

(72) Inventor: Sadao Ito, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 37 days.

(21) Appl. No.: 16/742,163

(22) Filed: Jan. 14, 2020

(65) Prior Publication Data

US 2020/0223342 A1 Jul. 16, 2020

(30) Foreign Application Priority Data

Jan. 16, 2019 (JP) .............................. JP2019-004999

(51) Int. Cl.
  *B60N 2/90* (2018.01)
  *B60N 2/02* (2006.01)
  *B60N 2/10* (2006.01)

(52) U.S. Cl.
  CPC ........... *B60N 2/995* (2018.02); *B60N 2/0232* (2013.01); *B60N 2/10* (2013.01); *B60N 2002/0236* (2013.01)

(58) Field of Classification Search
  CPC ............ B60N 2002/0236; B60N 2/995; B60N 2/0232; B60N 2/10; A47C 7/506; A47C 7/5062; A47C 7/5064; A47C 7/5066; A47C 7/5068
  USPC ....................................... 297/423.25–423.28
  See application file for complete search history.

(56) References Cited

U.S. PATENT DOCUMENTS

| 6,557,934 | B2 * | 5/2003 | Wiecek | A47C 1/035 297/84 |
| 6,659,556 | B2 * | 12/2003 | Pellerin | A61G 5/14 297/330 |
| 7,338,132 | B2 * | 3/2008 | LaPointe | A47C 1/034 297/423.26 |
| 8,132,855 | B2 * | 3/2012 | Richard | A47C 1/0345 297/84 |
| 8,876,212 | B2 * | 11/2014 | Yamada | B60N 2/767 297/411.32 |
| 2005/0258670 | A1 * | 11/2005 | LaPointe | A47C 1/0342 297/85 L |
| 2013/0049411 | A1 * | 2/2013 | LaPointe | A61G 5/14 297/68 |

(Continued)

FOREIGN PATENT DOCUMENTS

JP 2015-160473 9/2015

*Primary Examiner* — Mark R Wendell
(74) *Attorney, Agent, or Firm* — Greenblum & Bernstein, P.L.C.

(57) ABSTRACT

A vehicle seat includes a seat cushion, an ottoman, a driving unit, and a power transmission mechanism. An ottoman frame formed as a framework of the ottoman is pivotably attached to a cushion frame formed as a framework of the seat cushion. The driving unit has an output shaft capable of outputting a rotational driving force, and the ottoman frame has a pantograph mechanism that allows the ottoman to deform between an extended state and an unextended state. The power transmission mechanism has a pinion gear fixed to the output shaft, and a first sector gear meshing with the pinion gear. The first sector gear is connected to a driving link of the pantograph mechanism, to implement pivoting and deformation of the ottoman.

11 Claims, 15 Drawing Sheets

1A

(56) References Cited

U.S. PATENT DOCUMENTS

| | | | | |
|---|---|---|---|---|
| 2013/0062914 A1* | 3/2013 | Marshall | ............... | A47C 7/5068 |
| | | | | 297/69 |
| 2013/0300177 A1* | 11/2013 | Yamada | ................. | B60N 2/995 |
| | | | | 297/423.19 |
| 2014/0333099 A1* | 11/2014 | Lu | ......................... | A47C 1/0355 |
| | | | | 297/83 |
| 2016/0058191 A1* | 3/2016 | Hegedus | ............... | A47C 1/0342 |
| | | | | 297/330 |
| 2016/0058195 A1* | 3/2016 | Huang | ................... | A47C 1/031 |
| | | | | 248/398 |
| 2018/0338620 A1* | 11/2018 | Katori | .................... | B60N 2/995 |
| 2019/0313796 A1* | 10/2019 | Lapointe | .............. | A47C 7/5068 |
| 2019/0350362 A1* | 11/2019 | Lapointe | ................ | A47C 1/034 |
| 2019/0350368 A1* | 11/2019 | Lapointe | ................ | A47C 7/506 |

\* cited by examiner

VEHICLE SEAT

This nonprovisional application is based on Japanese Patent Application No. 2019-004999 filed on Jan. 16, 2019 with the Japan Patent Office, the entire contents of which are hereby incorporated by reference.

BACKGROUND

Field

The present disclosure relates to a vehicle seat, and particularly to a vehicle seat installed in a vehicle such as an automobile.

Description of the Background Art

Conventionally, vehicle seats having various kinds of configurations have been proposed. As one of these vehicle seats, there is a known vehicle seat provided with an ottoman. The ottoman is attached to the front end portion of a seat cushion to thereby function as a leg rest that supports the legs of an occupant of a vehicle. Usually, the ottoman has an extension mechanism so as to be able to deform between an extended state and an unextended state. The ottoman is deformed into the extended state only when necessary, to be used as a leg rest.

A vehicle seat provided with this type of ottoman is disclosed, for example, in Japanese Patent Laying-Open No. 2015-160473. In the vehicle seat disclosed in this document, the above-mentioned extension mechanism is configured as a so-called pantograph mechanism formed of a plurality of combined links, and this pantograph mechanism is configured to be driven by an electric motor as a driving source.

In the vehicle seat disclosed in the above-mentioned document, the electric motor and a driving link of the pantograph mechanism are connected to each other by a feed screw mechanism as a power transmission mechanism. Thereby, rotary motion generated at the electric motor is translated into linear motion by the feed screw mechanism and input to the driving link, so that the driving link is driven in the seat front-rear direction to cause the ottoman to deform.

SUMMARY

While the above-mentioned feed screw mechanism is a power transmission mechanism suitable for driving an ottoman from a structural standpoint, the feed screw mechanism is not necessarily optimal from the standpoint of motion transmission efficiency, installation flexibility and the like. That is, the feed screw mechanism generally has a low motion transmission efficiency, and also has an extremely limited installation flexibility since a large space is required for installation of a feed screw.

Accordingly, an ottoman cannot be driven efficiently in a vehicle seat including such a feed screw mechanism, and the design flexibility cannot be ensured for the vehicle seat as a whole.

Therefore, the present disclosure was made in view of the problems described above, and has an object to provide a vehicle seat which is highly efficient in transmitting a driving force from a driving unit to an ottoman, and which has a higher design flexibility than has been conventionally possible.

A vehicle seat according to an aspect of the present disclosure includes: a base to be installed on a floor of a vehicle; a seat cushion provided with a seat surface; an ottoman provided with a leg rest surface; a driving unit provided with an output shaft capable of outputting a rotational driving force in a forward direction and a reverse direction; and a power transmission mechanism that transmits the rotational driving force generated at the output shaft. The seat cushion has a cushion frame formed as a framework of the seat cushion and attached to the base, and the ottoman has an ottoman frame formed as a framework of the ottoman and attached to a front end portion of the cushion frame. The ottoman frame has a pantograph mechanism that allows the ottoman to deform between an extended state and an unextended state, and the ottoman frame is pivotably supported by the cushion frame so as to allow the ottoman to pivot. The power transmission mechanism has a pinion gear fixed to the output shaft, and a first sector gear rotatably supported by the cushion frame and meshing with the pinion gear.

In the vehicle seat according to an aspect of the present disclosure, the first sector gear is connected to a driving link of the pantograph mechanism, so that the rotational driving force generated at the output shaft is input to the driving link by being transmitted through the pinion gear and the first sector gear, and the pivoting and the deformation of the ottoman is performed in response to this input of the rotational driving force to the driving link.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
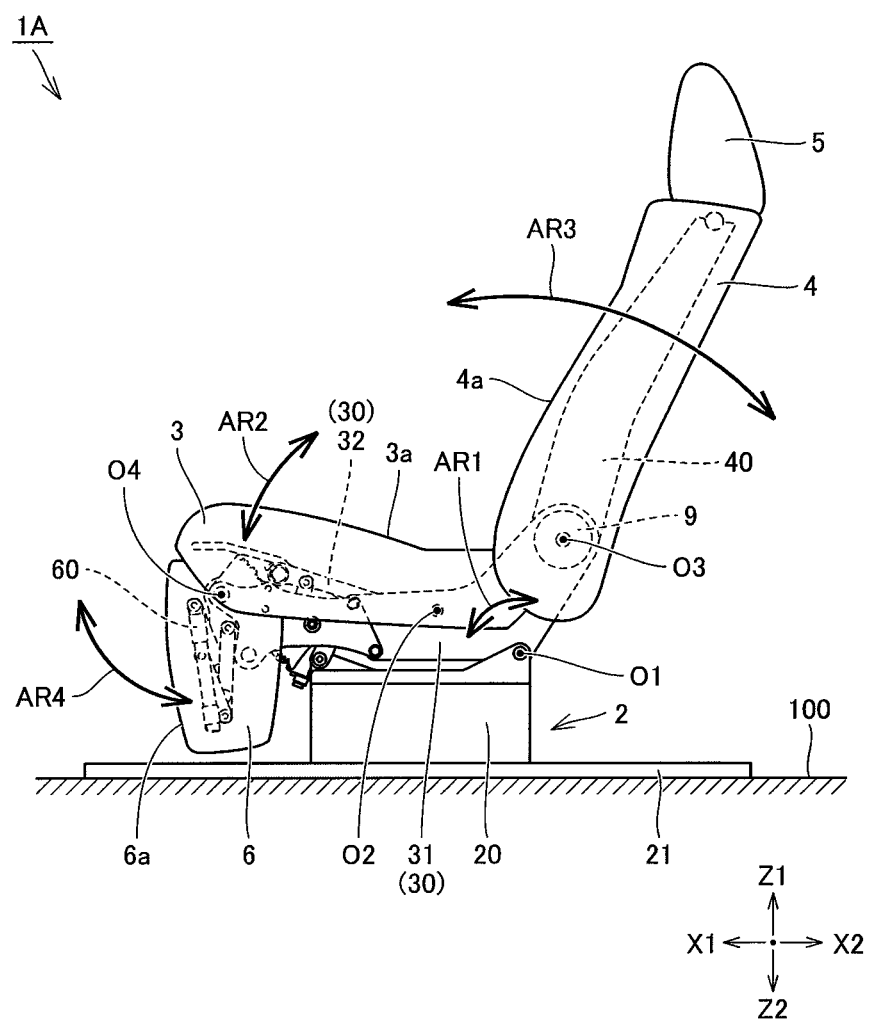
FIG. 1 is a schematic side view showing a first usage state of a vehicle seat according to a first embodiment.

In the following, embodiments will be described in detail with reference to the accompanying drawings. Each of the embodiments described below exemplifies the case where the characteristic configuration of the present disclosure is applied to a vehicle seat configured as a seat of an automobile. In the embodiments described below, the same or corresponding components are designated by the same reference characters, and description thereof will not be repeated.

In each of the figures, as seen from an occupant of a vehicle as a user who sits on a vehicle seat, the forward direction and the rearward direction of the seat are represented as an X1 direction and an X2 direction, respectively, the leftward direction and the rightward direction of the seat are represented as a Y1 direction and a Y2 direction, respectively, and the upward direction and the downward direction of the seat are represented as a Z1 direction and a Z2 direction, respectively. In the following description, the axis extending in forward direction X1 and rearward direction X2 of the seat will be referred to as an X axis, the axis extending in leftward direction Y1 and rightward direction Y2 of the seat will be referred to as a Y axis, and the axis extending in upward direction Z1 and downward direction Z2 of the seat will be referred to as a Z axis. A seat width direction corresponds to the direction in which the Y axis extends.

First Embodiment

Figure 2:
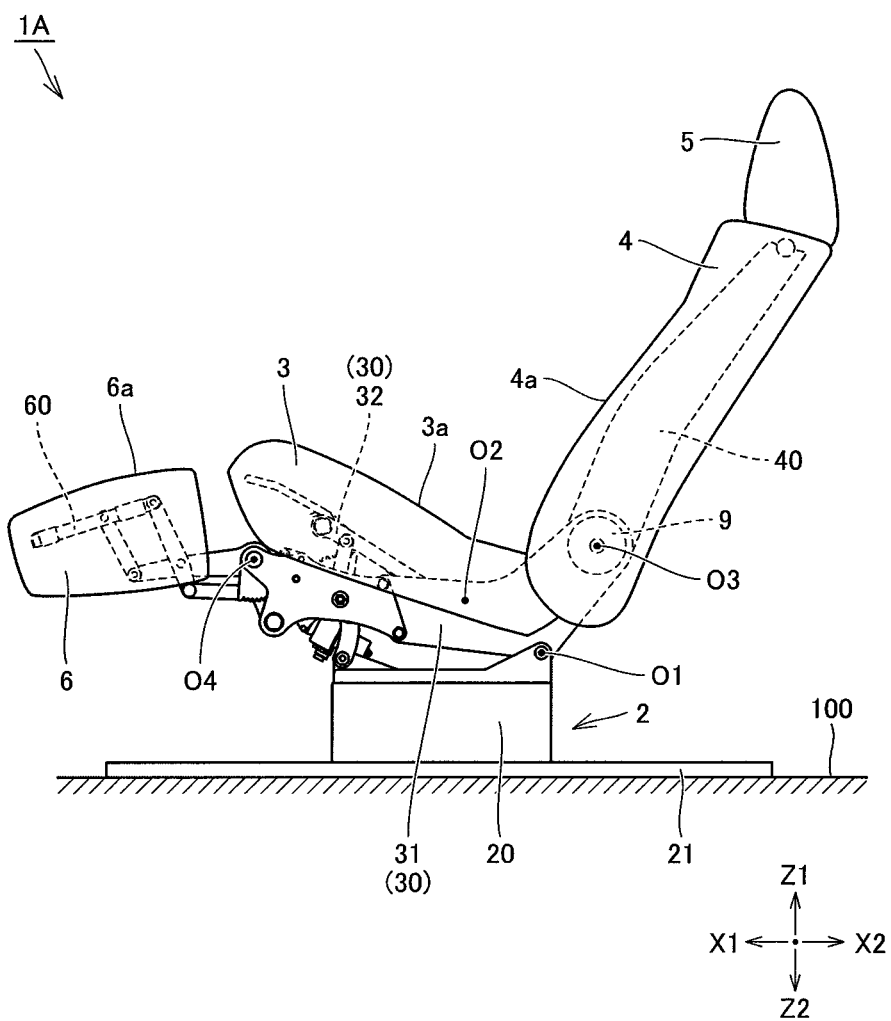
FIG. 2 is a schematic side view showing a second usage state of the vehicle seat according to the first embodiment.

FIGS. 1 and 2 are schematic side views showing first and second usage states of a vehicle seat according to a first embodiment, respectively. Referring first to FIGS. 1 and 2, a schematic configuration as well as the first and second usage states of a vehicle seat 1A according to the present embodiment are described.

As shown in FIGS. 1 and 2, vehicle seat 1A mainly includes a base 2, a seat cushion 3, a seat back 4, a headrest 5, and an ottoman 6. Base 2 is for vehicle seat 1A, and provided on a floor 100 of a vehicle. Thereby, vehicle seat 1A is installed on floor 100 of the vehicle.

Seat cushion 3 is provided on base 2. Seat back 4 is provided to extend upward from the rear end portion of seat cushion 3, and headrest 5 is provided at the upper end portion of seat back 4. Ottoman 6 is provided at the front end portion of seat cushion 3.

The first usage state shown in FIG. 1 is a usage mode in which an occupant of the vehicle sits on vehicle seat 1A without using ottoman 6. In the first usage state, seat cushion 3 is disposed at a first seat position which will be described later in detail, and seat back 4 is disposed at a first backrest position which will be described later in detail. Ottoman 6 is in an unextended state which will be described later in detail, and disposed at a stored position which will be described later in detail.

The second usage state shown in FIG. 2 is a usage mode in which the occupant of the vehicle sits on vehicle seat 1A while using ottoman 6. In the second usage state, seat cushion 3 is disposed at a second seat position which will be described later in detail, and seat back 4 is disposed at a second backrest position which will be described later in detail. Ottoman 6 is in an extended state which will be described later in detail, and disposed at a used position which will be described later in detail.

Figure 3:
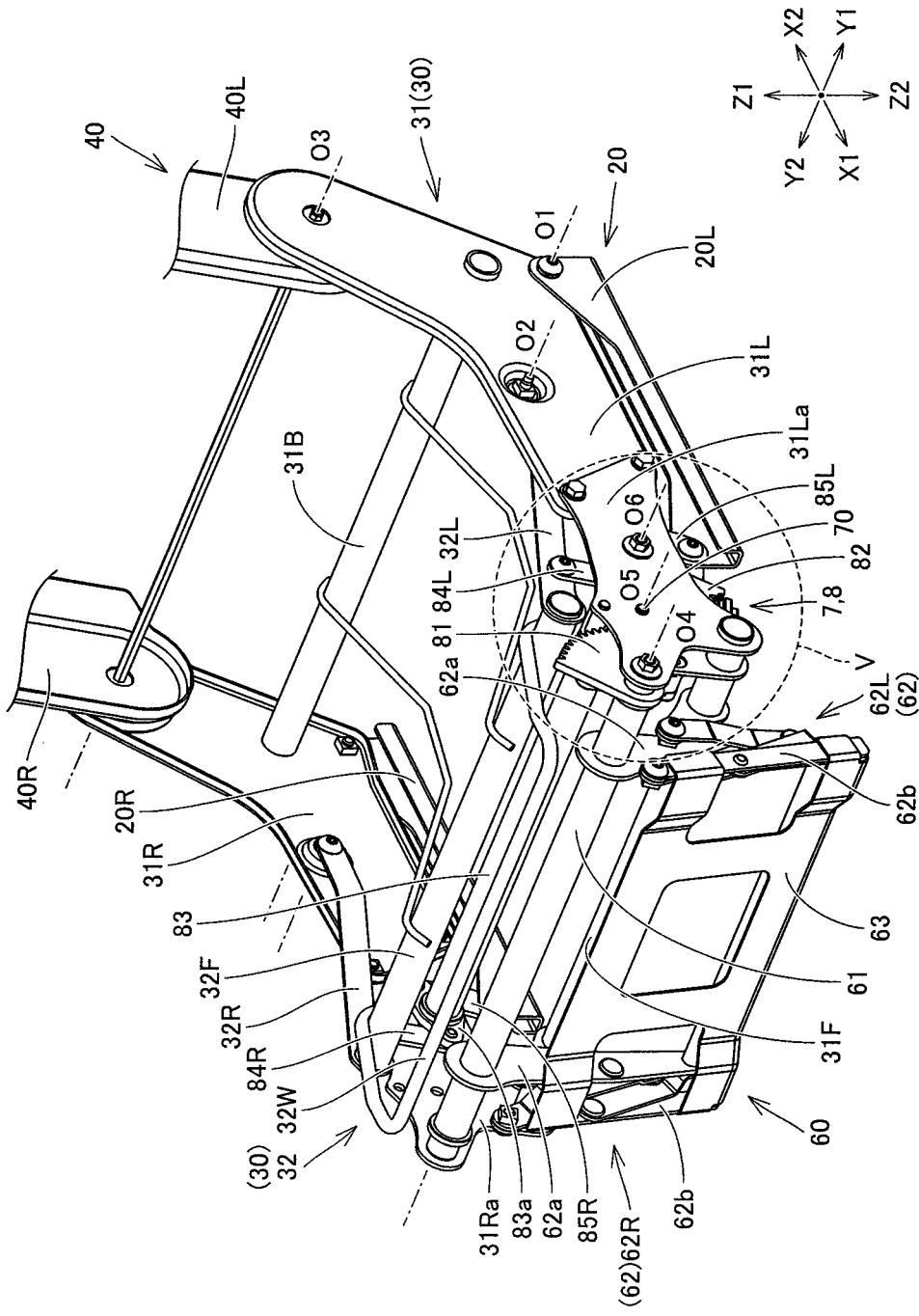
FIG. 3 is a schematic perspective view showing a state of a framework structure of a main part in the first usage state of the vehicle seat according to the first embodiment.
Figure 4:
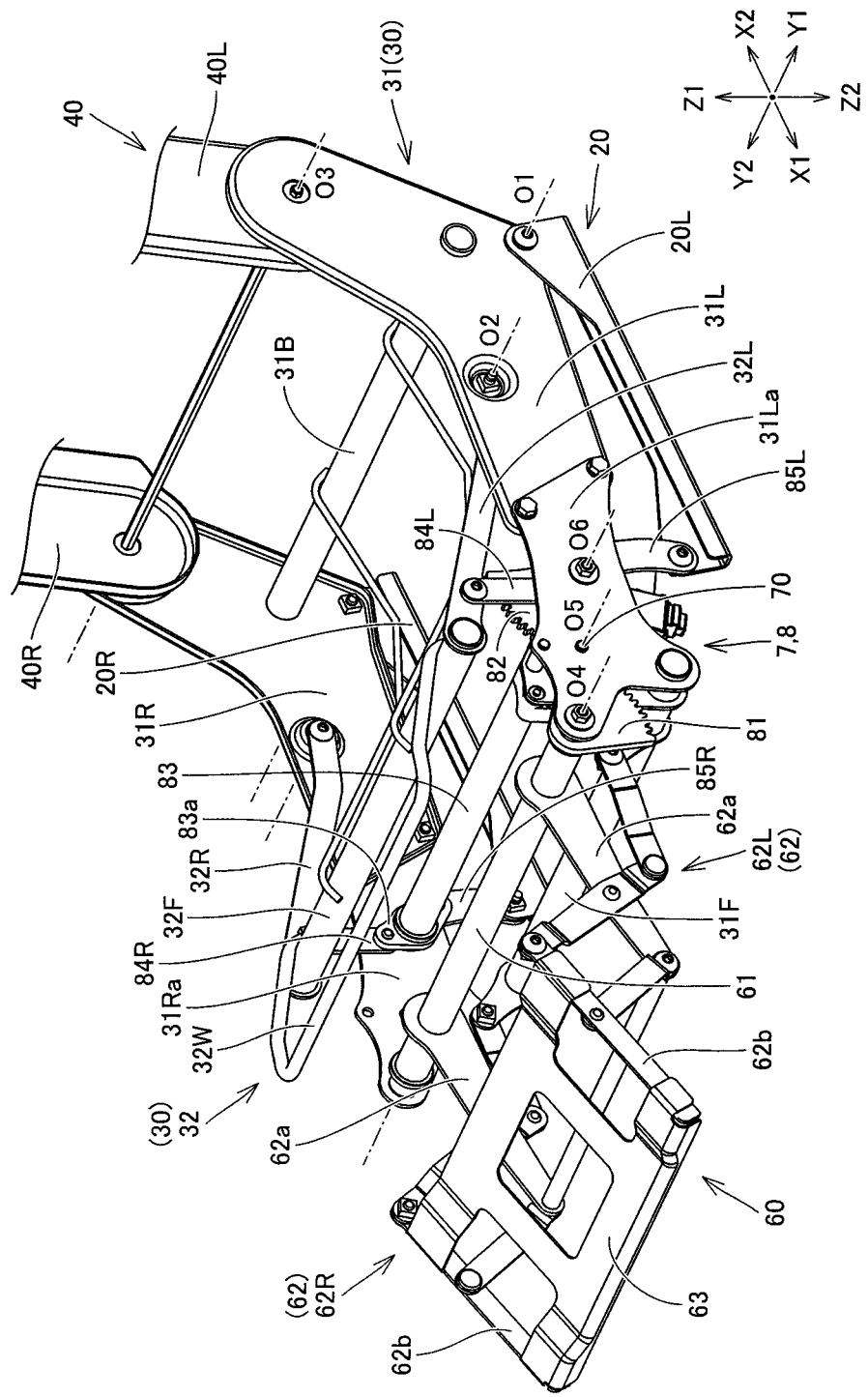
FIG. 4 is a schematic perspective view showing a state of the framework structure of the main part in the second usage state of the vehicle seat according to the first embodiment.

In addition to base 2, seat cushion 3, seat back 4, headrest 5 and ottoman 6 described above, vehicle seat 1A according to the present embodiment further includes a driving unit 7 including an electric motor, and a power transmission mechanism 8 for transmitting a driving force generated by driving unit 7 (see FIGS. 3, 4 and the like). Switching between the above-mentioned first usage state and second usage state is implemented by transmission of the driving force generated by driving unit 7 to seat cushion 3, ottoman 6 and the like through power transmission mechanism 8.

As described above, vehicle seat 1A according to the present embodiment is electrically powered such that switching between the first usage state and the second usage state is implemented by a driving force of a driving motor. Thus, switching between these first usage state and second usage state is automatically performed such as by operation of an operation unit (an operation lever, an operation button or the like) (not shown) by the occupant of the vehicle. The configurations of driving unit 7 and power transmission mechanism 8 will be described later in detail.

As shown in FIGS. 1 and 2, base 2 has a base frame 20 formed as a framework of base 2, and a slide rail 21. Slide rail 21 is fixed to floor 100 of the vehicle, and base frame 20 is supported to be movable in the X-axis direction by slide rail 21. Thereby, the entire vehicle seat 1A excluding slide rail 21 can be moved in the seat front-rear direction such as by operation of the operation unit (not shown).

Seat cushion 3 has a seat surface 3a on which the occupant of the vehicle can be seated, and is provided on base 2 as described above. Seat cushion 3 mainly has a cushion frame 30 formed as a framework of seat cushion 3, a cushion pad covering cushion frame 30, and a cushion cover covering the cushion pad to define above-mentioned seat surface 3a. Cushion frame 30 has a main frame 31 attached to base 2, and a subframe 32 attached to main frame 31.

Seat cushion 3 is pivotably supported by base 2 so as to allow the front end portion and the rear end portion of seat cushion 3 to swing upward and downward. Specifically, main frame 31 is supported by base frame 20 so as to be pivotable in a direction of an arrow AR1 shown in FIG. 1 about a first rotation axis O1 extending in the seat width direction. Subframe 32 is supported by main frame 31 so as to be pivotable in a direction of an arrow AR2 shown in FIG. 1 about a second rotation axis O2 extending in the seat width direction. Thereby, seat cushion 3 is configured to be pivotable relative to base 2 between the first seat position shown in FIG. 1 and the second seat position shown in FIG. 2.

Seat back 4 has a backrest surface 4a on which the occupant of the vehicle can lean, and is provided to extend upward from the rear end portion of seat cushion 3 as described above. Seat back 4 mainly has a back frame 40 formed as a framework of seat back 4, a back pad covering back frame 40, and a back cover covering the back pad to define backrest surface 4a.

Seat back 4 is pivotably supported by seat cushion 3 so as to allow the tip end portion (that is, the upper end portion at which headrest 5 is provided) of seat back 4 to swing forward and backward. Specifically, back frame 40 is supported by cushion frame 30 so as to be pivotable in a direction of an arrow AR3 shown in FIG. 1 about a third rotation axis O3 extending in the seat width direction. Thereby, seat back 4 is configured to be pivotable relative to seat cushion 3 between the first backrest position shown in FIG. 1 and the second backrest position shown in FIG. 2.

A recliner 9 is provided at a portion where cushion frame 30 and back frame 40 are coupled to each other. Cushion frame 30 and back frame 40 are coupled to each other through this recliner 9, so that back frame 40 is configured such that its angle with respect to cushion frame 30 can be adjusted. Thereby, the backrest angle of seat back 4 can be adjusted such as by operation of the operation unit (not shown).

Headrest 5 is provided at the upper end portion of seat back 4 as described above, and mainly has a headrest frame (not shown), a headrest pad covering the headrest frame, and a headrest cover covering the headrest pad. Headrest 5 is a portion on which the occupant of the vehicle seated on vehicle seat 1A places his/her head.

Ottoman 6 has a leg rest surface 6a on which the legs (in particular, the calves) of the occupant of the vehicle can be placed, and is provided at the front end portion of seat cushion 3 as described above. Ottoman 6 mainly has an ottoman frame 60 formed as a framework of ottoman 6, an ottoman pad covering ottoman frame 60, and an ottoman cover covering the ottoman pad to define above-mentioned leg rest surface 6a.

Ottoman frame 60 is supported by cushion frame 30 (more precisely, main frame 31) so as to be pivotable in a direction of an arrow AR4 shown in FIG. 1 about a fourth rotation axis O4 extending in the seat width direction. Ottoman frame 60 has a pantograph mechanism 62 which will be described later (see FIGS. 3, 4 and the like), and is configured to be deformable to expand and contract with above-mentioned fourth rotation axis O4 as a base point.

With such pivoting and deformation of ottoman frame 60, ottoman 6 is configured to be pivotable relative to seat cushion 3 between the stored position shown in FIG. 1 and the used position shown in FIG. 2, and configured to be deformable between the unextended state shown in FIG. 1 and the extended state shown in FIG. 2. Thereby, leg rest surface 6a provided on ottoman 6 is configured to change between the state of FIG. 1 in which leg rest surface 6a generally faces the forward direction of the seat (that is, the X1 direction) and the state of FIG. 2 in which leg rest surface 6a generally faces the upward direction of the seat (that is, the Z1 direction).

Figure 5:
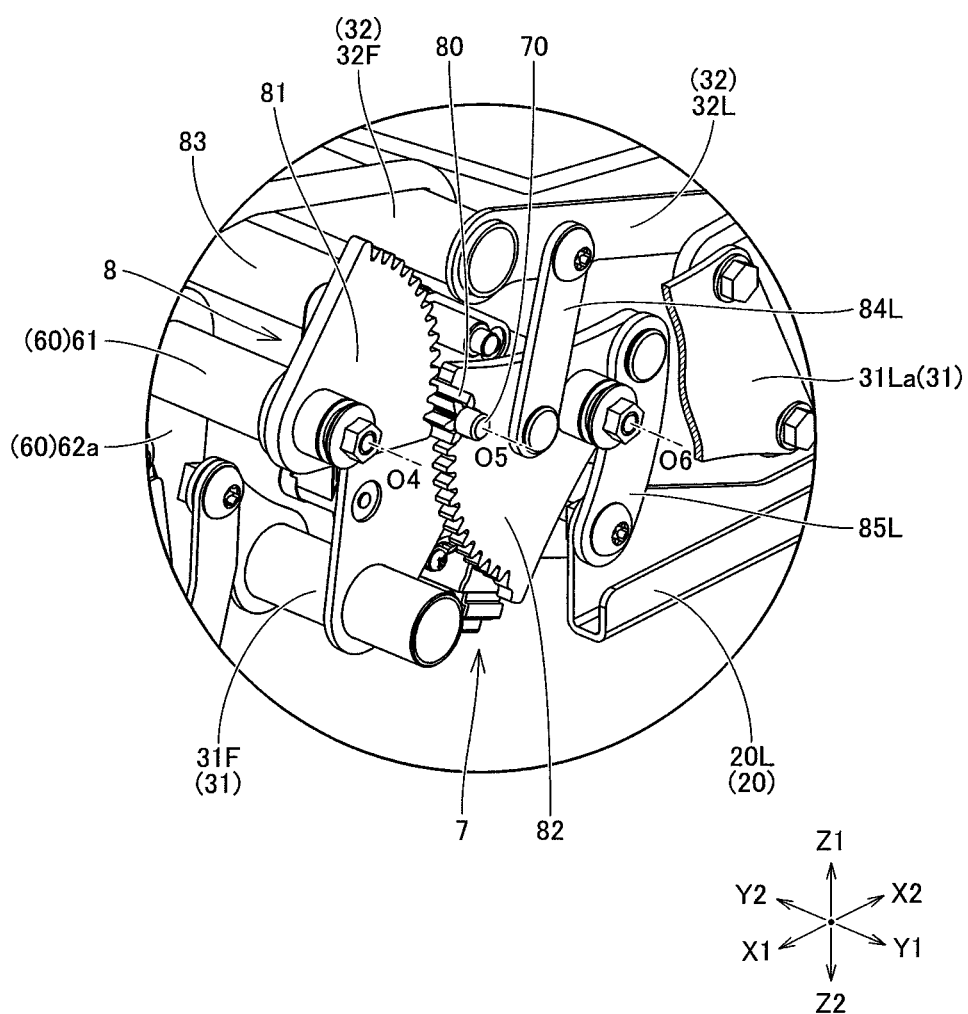
FIG. 5 is an enlarged view of a region V shown in FIG. 3.

FIGS. 3 and 4 are both schematic perspective views showing a framework structure of a main part of the vehicle seat according to the present embodiment. FIG. 3 shows the framework structure in the above-mentioned first usage state, and FIG. 4 shows the framework structure in the above-mentioned second usage state. FIG. 5 is an enlarged view of a region V shown in FIG. 3. Referring now to FIGS. 3 to 5, the framework structure of the main part of vehicle seat 1A according to the present embodiment is described, and above-mentioned driving unit 7 and power transmission mechanism 8 are discussed in detail. To facilitate understanding, each of base frame 20, cushion frame 30, back frame 40 and ottoman frame 60 is partially not shown in FIGS. 3 to 5. In particular, cushion frame 30 is shown as being partially cut away in FIG. 5.

As shown in FIGS. 3 and 4, base frame 20 has side frames 20L and 20R as a pair of left and right frames at its upper end portion. Each of side frames 20L and 20R is formed of a press-molded product produced, for example, by press-working a metal plate such as a steel plate, and disposed to extend in the seat front-rear direction (that is, the X-axis direction).

Cushion frame 30 has main frame 31 and subframe 32 as described above. Main frame 31 is attached to base frame 20, and subframe 32 is attached to main frame 31.

Main frame 31 has a generally frame shape as seen in a plan view, and has side frames 31L and 31R as a pair of left and right frames, and a front pipe 31F and a rear pipe 31B as a pair of front and rear frames.

Each of side frames 31L and 31R is formed of a press-molded product produced, for example, by press-working a metal plate such as a steel plate, and disposed to extend in the seat front-rear direction (that is, the X-axis direction). Each of front pipe 31F and rear pipe 31B is formed of a metal-made hollow cylindrical member such as a steel pipe, for example, and disposed to extend in the seat width direction (that is, the Y-axis direction). Front pipe 31F couples the front end portions of side frames 31L and 31R while rear pipe 31B couples the rear end portions of side frames 31L and 31R.

In the present embodiment, each of side frames 31L and 31R is formed of a plurality of metal plates (specifically, two metal plates) in consideration of attachment efficiency. The front end portions of side frames 31L and 31R are formed of brackets 31La and 31Ra, respectively, which are each formed of a flat metal plate.

Subframe 32 has a generally U shape as seen in a plan view, and has side frames 32L and 32R as a pair of left and right frames, and a front pipe 32F and a front wire 32W as a front frame.

Each of side frames 32L and 32R is formed of a press-molded product produced, for example, by press-working a metal plate such as a steel plate, and disposed to extend in the seat front-rear direction (that is, the X-axis direction). Front pipe 32F is formed of a metal-made hollow cylindrical member such as a steel pipe, for example, and disposed to extend in the seat width direction (that is, the Y-axis direction). Front wire 32W is formed of a metal-made wire rod, for example, and disposed to have respective opposing end portions extending generally in the seat front-rear direction (that is, the X-axis direction), and a central portion extending in the seat width direction (that is, the Y-axis direction). Front pipe 32F couples the front end portions of side frames 32L and 32R, and front wire 32W is fixed to front pipe 32F so as to protrude in the forward direction of the seat (that is, the X1 direction) from front pipe 32F.

The rearward portions of side frames 31L and 31R included in main frame 31 are rotatably coupled to the rear end portions of side frames 20L and 20R included in base frame 20, respectively. Thereby, main frame 31 is pivotably supported by base frame 20 as described above, with above-mentioned first rotation axis O1 extending in the seat width direction at the portions where these main frame 31 and base frame 20 are coupled to each other.

The rear end portions of side frames 32L and 32R included in subframe 32 are rotatably coupled to the rearward portions of side frames 31L and 31R included in main frame 31, respectively. Thereby, subframe 32 is pivotably supported by main frame 31 as described above, with above-mentioned second rotation axis O2 extending in the seat width direction at the portions where these main frame 31 and subframe 32 are coupled to each other.

Thus, main frame 31 pivots relative to base frame 20 and subframe 32 pivots relative to main frame 31, causing the cushion pad and the cushion cover (not shown) supported by cushion frame 30 formed of these main frame 31 and subframe 32 to pivot, thus allowing the front end portion of seat cushion 3 to swing upward and downward.

Back frame 40 has side frames 40L and 40R as a pair of left and right frames. Each of side frames 40L and 40R is formed of a press-molded product produced, for example, by press-working a metal plate such as a steel plate, and disposed to extend generally in the seat up-down direction (that is, the Z-axis direction).

The lower end portions of side frames 40L and 40R included in back frame 40 are rotatably coupled to the rear end portions of side frames 31L and 31R included in main frame 31 of cushion frame 30, respectively. Thereby, back frame 40 is pivotably supported by cushion frame 30 as described above, with above-mentioned third rotation axis O3 extending in the seat width direction at the portions where these cushion frame 30 and back frame 40 are coupled to each other.

Thus, back frame 40 pivots relative to cushion frame 30, causing the back pad and the back cover (not shown) supported by back frame 40 to pivot, thus allowing the tip end portion of seat back 4 to swing forward and backward.

Ottoman frame 60 has a base pipe 61, pantograph mechanism 62, and a base plate 63. Among them, pantograph mechanism 62 has a pair of left and right crosslink mechanisms 62L and 62R each formed of a plurality of combined links.

Base pipe 61 is formed of a metal-made hollow cylindrical member such as a steel pipe, for example, and disposed to extend in the seat width direction (that is, the Y-axis direction). Base pipe 61 is provided to bridge the front end portions of side frames 31L and 31R included in main frame 31 of cushion frame 30, and rotatably supported by these side frames 31L and 31R. Thus, above-mentioned fourth rotation axis O4 extends in the seat width direction at the portions where these cushion frame 30 and base pipe 61 are coupled to each other.

Each of crosslink mechanisms 62L and 62R forming pantograph mechanism 62 has a plurality of links as described above, and the plurality of links each include a driving link 62a and a driven link 62b. Driving link 62a receives input of a driving force from outside the cross link mechanism to transmit the driving force to another link, and driven link 62b outputs the driving force transmitted through the above-mentioned another link to the outside of the cross link mechanism.

Crosslink mechanisms 62L and 62R are fixed to the left end portion and the right end portion of front pipe 31F included in main frame 31 of cushion frame 30, respectively, and fixed to the left end portion and the right end portion of base pipe 61, respectively. Among them, the portion fixed to each of the left end portion and the right end portion of base pipe 61 corresponds to above-mentioned driving link 62a.

Crosslink mechanisms 62L and 62R are structured in mirror symmetry with respect to a plane orthogonal to the seat width direction. Thus, these crosslink mechanisms 62L and 62R deform to expand and contract in conjunction with each other when they are driven, and cooperate to drive base plate 63 to which they provide output.

The above-mentioned plurality of links are each formed of a press-molded product produced, for example, by press-working a metal plate such as a steel plate. These plurality of links are combined with one another and rotatably coupled to one another at their prescribed positions, to form above-mentioned crosslink mechanisms 62L and 62R.

Base plate 63 forms a base for leg rest surface 6a of ottoman 6, and is formed of a press-molded product produced, for example, by press-working a metal plate such as a steel plate. Base plate 63 is fixed to respective driven links 62b included in above-mentioned crosslink mechanisms 62L and 62R so as to bridge crosslink mechanisms 62L and 62R. Thereby, base plate 63 is disposed to extend in the seat width direction (that is, the Y-axis direction).

Base pipe 61 is rotatably supported by side frames 31L and 31R included in main frame 31 as described above, and driving links 62a of the pair of left and right crosslink mechanisms 62L and 62R are fixed to this base pipe 61. Thus, rotation of base pipe 61 causes ottoman frame 60 to pivot about fourth rotation axis O4, and pantograph mechanism 62 to deform to expand and contract with fourth rotation axis O4 as a base point. Consequently, the ottoman pad and the ottoman cover (not shown) supported by ottoman frame 60 move, causing the entire ottoman 6 to pivot and deform.

As shown in FIGS. 3 to 5, in vehicle seat 1A according to the present embodiment, driving unit 7 is provided in the vicinity of the front end portion of main frame 31 of cushion frame 30. More specifically, driving unit 7 is attached to the front end portion of side frame 31L (the side frame disposed on the left side in the seat width direction) included in main frame 31.

Driving unit 7 has an electric motor as a driving source, a reduction gear connected to the electric motor, and an output shaft 70 connected to the reduction gear. Output shaft 70 outputs a driving force generated by the electric motor to the outside of driving unit 7, and receives transmission of this driving force to rotate in a forward direction and a reverse direction about a fifth rotation axis O5 which is its central axis. Thereby, output shaft 70 can output the driving force generated by the electric motor and reduced by the reduction gear as a rotational driving force.

On the other hand, power transmission mechanism 8 is provided at the front end portion of main frame 31 of cushion frame 30. Power transmission mechanism 8 is formed of a pinion gear 80 (see FIG. 5), a first sector gear 81, a second sector gear 82, a coupling shaft 83, a pair of left and right first coupling members 84L and 84R, and a pair of left and right second coupling members 85L and 85R.

Among them, coupling shaft 83 is formed of a metal-made hollow cylindrical member such as a steel pipe, for example, and disposed to extend in the seat width direction (that is, the Y-axis direction). More specifically, coupling shaft 83 is provided to bridge the front end portions of side frames 31L and 31R included in main frame 31 of cushion frame 30, and rotatably supported by these side frames 31L and 31R. Thereby, coupling shaft 83 is configured to be rotatable about a sixth rotation axis O6 extending in the seat width direction.

Pinion gear 80 is fixed to output shaft 70 of driving unit 7, and thereby rotates, with rotation of output shaft 70, in the forward direction and the reverse direction about above-mentioned fifth rotation axis O5. Pinion gear 80 is formed of a metal-made member, for example.

First sector gear 81 is fixed to the left end portion of base pipe 61 of above-mentioned ottoman frame 60, and rotatably supported through base pipe 61 by the front end portions of side frames 31L and 31R included in main frame 31 of cushion frame 30. A tooth surface of first sector gear 81 faces a tooth surface of pinion gear 80 fixed to output shaft 70, causing first sector gear 81 to mesh with pinion gear 80.

Second sector gear 82 is fixed to the left end portion of above-mentioned coupling shaft 83, and rotatably supported through coupling shaft 83 by the front end portions of side frames 31L and 31R included in main frame 31 of cushion frame 30. A tooth surface of second sector gear 82 faces the tooth surface of pinion gear 80 fixed to output shaft 70, causing second sector gear 82 to mesh with pinion gear 80.

Consequently, each of first sector gear 81 and second sector gear 82 follows the rotation of pinion gear 80 to rotate in the forward direction and the reverse direction. The rotation axis of first sector gear 81 corresponds to above-mentioned fourth rotation axis O4, and the rotation axis of second sector gear 82 corresponds to above-mentioned sixth rotation axis O6. Each of first sector gear 81 and second sector gear 82 is formed of a metal-made member.

As shown in FIG. 5, first coupling member 84L disposed on the left side in the seat width direction has one end rotatably coupled to second sector gear 82, and the other end rotatably coupled to the frontward portion of side frame 32L (the side frame disposed on the left side in the seat width direction) included in subframe 32 of cushion frame 30.

As shown in FIGS. 3 and 4, first coupling member 84R disposed on the right side in the seat width direction has one end rotatably coupled to a bracket 83a provided at the right end portion of coupling shaft 83, and the other end rotatably coupled to the frontward position of side frame 32R (the side frame disposed on the right side in the seat width direction) included in subframe 32 of cushion frame 30.

Thereby, subframe 32 and second sector gear 82 are connected to each other so as to allow power transmission through first coupling members 84L and 84R. Thus, with rotation of second sector gear 82 in the forward direction and the reverse direction, subframe 32 pivots relative to main frame 31 about second rotation axis O2.

As shown in FIG. 5, second coupling member 85L disposed on the left side in the seat width direction has one end rotatably coupled to second sector gear 82, and the other end rotatably coupled to the front end portion of side frame 20L (the side frame disposed on the left side in the seat width direction) included in base frame 20.

As shown in FIGS. 3 and 4, second coupling member 85R disposed on the right side in the seat width direction has one end rotatably coupled to bracket 83a provided at the right end portion of coupling shaft 83, and the other end rotatably coupled to the front end portion of side frame 20R (the side frame disposed on the right side in the seat width direction) included in base frame 20.

Thereby, base frame 20 and second sector gear 82 are connected to each other so as to allow power transmission through second coupling members 85L and 85R. Thus, with rotation of second sector gear 82 in the forward direction and the reverse direction, main frame 31 rotatably supporting second sector gear 82 pivots relative to base frame 20 about above-mentioned first rotation axis O1. As a result, the entire cushion frame 30 formed of main frame 31 and subframe 32 pivots relative to base frame 20.

The above-mentioned pair of first coupling members 84L and 84R is preferably shaped in mirror symmetry with respect to the plane orthogonal to the seat width direction, and the above-mentioned pair of second coupling members 85L and 85R is also preferably shaped in mirror symmetry with respect to the plane orthogonal to the seat width direction. Each of first coupling members 84L, 84R and second coupling members 85L, 85R is formed of a press-molded product produced, for example, by press-working a metal plate such as a steel plate.

Figure 6:
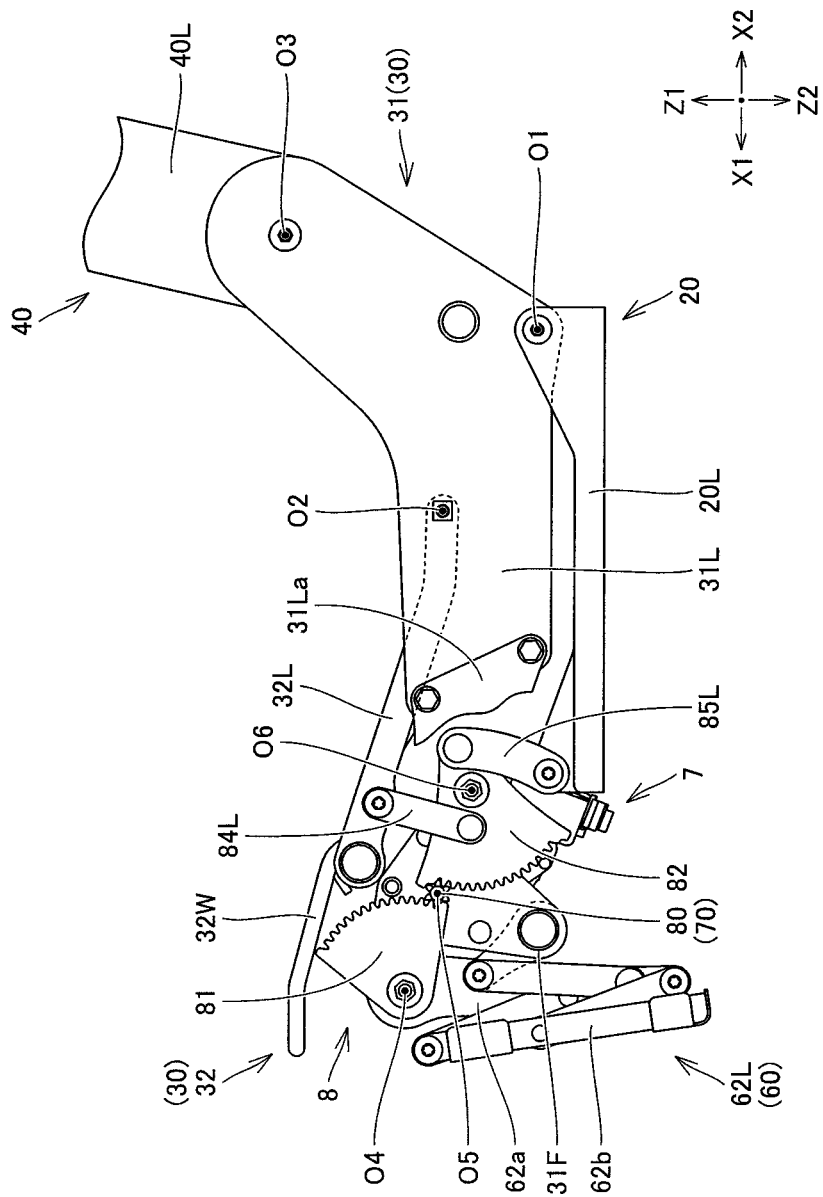
FIG. 6 is a schematic side view showing the state of the framework structure of the main part in the first usage state of the vehicle seat according to the first embodiment.
Figure 7:
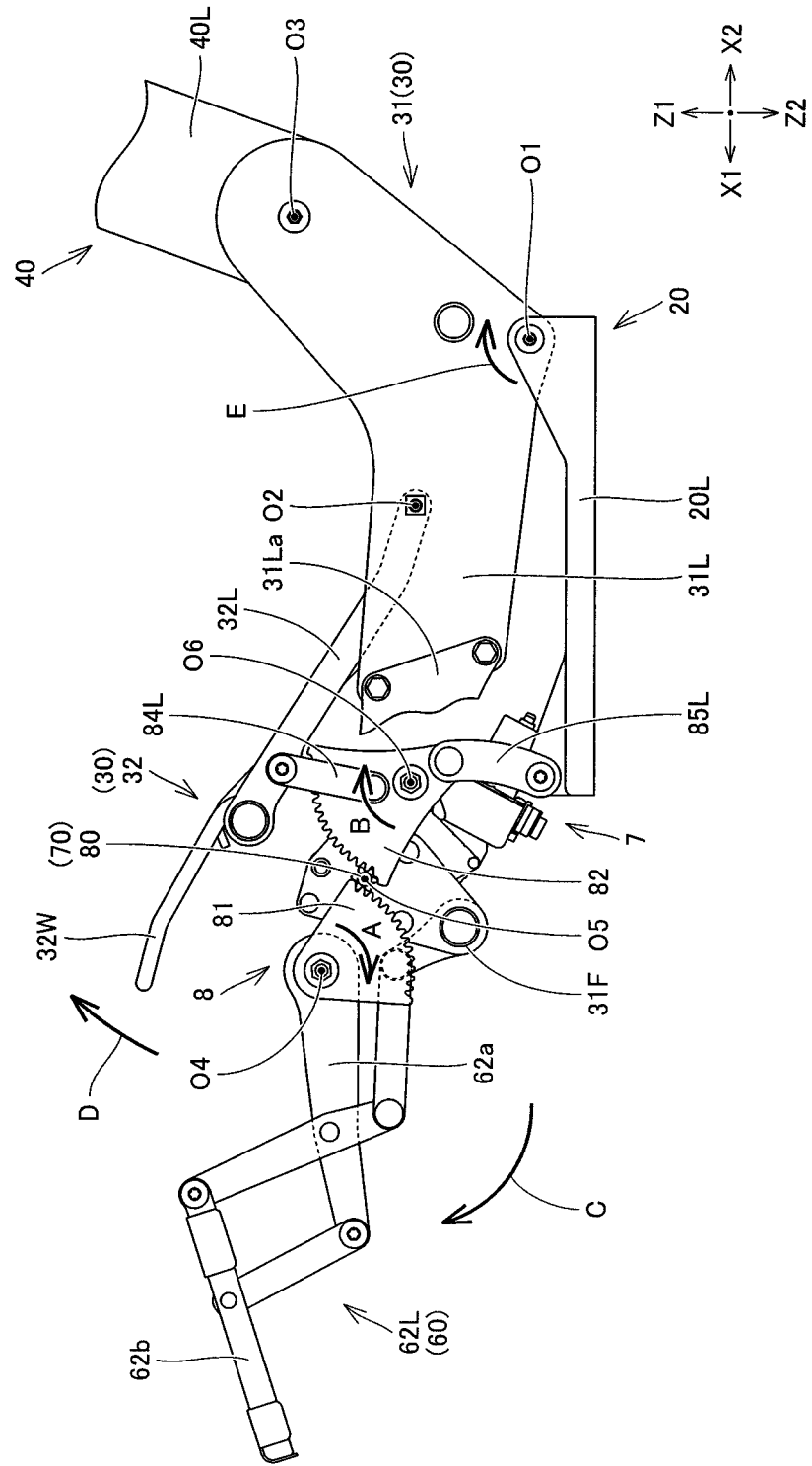
FIG. 7 is a schematic side view showing the state of the framework structure of the main part in the second usage state of the vehicle seat according to the first embodiment.

FIGS. 6 and 7 are schematic side views showing the states of the framework structure of the main part in the first and second usage states of the vehicle seat according to the present embodiment, respectively. Referring now to FIGS. 6 and 7 and the above-mentioned FIGS. 1 to 4, the positions where seat cushion 3, seat back 4 and ottoman 6 are disposed and the state of ottoman 6 in the first and second usage states of vehicle seat 1A according to the present embodiment are discussed in detail, and the operation of vehicle seat 1A during switching between these first usage state and second usage state is described.

Referring to FIGS. 1, 3 and 6, the first usage state is a usage mode in which the occupant of the vehicle sits on vehicle seat 1A without using ottoman 6 as described above. In the first usage state, the occupant of the vehicle can assume a sitting posture generally facing the forward direction of the seat (that is, the X1 direction). Referring to FIGS. 2, 4 and 7, on the other hand, the second usage state is a usage mode in which the occupant of the vehicle sits on vehicle seat 1A while using ottoman 6 as described above. In the second usage state, the occupant of the vehicle can assume a more supine posture generally facing the upward direction of the seat (that is, the Z1 direction).

In the first usage state, seat cushion 3 is disposed at the first seat position (see FIG. 1) with its seat surface 3a generally facing upward. In the second usage state, seat cushion 3 is disposed at the second seat position (see FIG. 2) with its seat surface 3a facing diagonally rearward in the upward direction. That is, the second seat position is a position that causes the front end portion of seat cushion 3 to be disposed higher than in the first seat position.

In the first usage state, seat back 4 is disposed at the first backrest position (see FIG. 1) with its backrest surface 4a generally facing forward. In the second usage state, seat back 4 is disposed at the second backrest position (see FIG. 2) with its backrest surface 4a facing diagonally forward in the upward direction. That is, the second backrest position is a position that causes the tip end portion (that is, the upper end portion) of seat back 4 to be disposed more rearward than in the first backrest position.

On the other hand, in the first usage state, ottoman 6 is disposed at the stored position (see FIG. 1) with its leg rest surface 6a generally facing forward. In the second usage state, ottoman 6 is disposed at the used position (see FIG. 2) with its leg rest surface 6a generally facing upward. That is, the used position is a position that causes the tip end portion (that is, the lower end portion in the first usage state) of ottoman 6 to be further tipped up diagonally forward in the upward direction than in the stored position.

In the first usage state, ottoman 6 is in the unextended state (see FIG. 1) in which above-mentioned pantograph mechanism 62 is folded to cause ottoman frame 60 to contract. In the second usage state, ottoman 6 is in the extended state (see FIG. 2) in which above-mentioned pantograph mechanism 62 is expanded to cause ottoman frame 60 to elongate.

In the first usage state, ottoman 6 is disposed at the stored position and enters the unextended state, so that ottoman 6 is housed below the front end portion of seat cushion 3. In the second usage state, ottoman 6 is disposed at the used position and enters the extended state, so that ottoman 6 overhangs forward from the front end portion of seat cushion 3.

Switching between these first usage state and second usage state is implemented by transmission of a driving force generated by driving unit 7 to seat cushion 3, ottoman 6 and the like through power transmission mechanism 8, as described above. This switching operation is discussed in detail below.

As shown in FIGS. 6 and 7, in vehicle seat 1A according to the present embodiment, first sector gear 81 and second sector gear 82 of power transmission mechanism 8 are disposed such that output shaft 70 of driving unit 7 lies therebetween in the seat front-rear direction (that is, the X-axis direction). More specifically, first sector gear 81 is located forward (that is, the X1 direction) relative to output shaft 70 while second sector gear 82 is located rearward (that is, the X2 direction) relative to output shaft 70.

Base pipe 61 of ottoman frame 60 to which first sector gear 81 is fixed (see FIGS. 3 to 5) is disposed at the upper portion of the front end portion of main frame 31 of cushion frame 30, and front pipe 31F included in main frame 31 of cushion frame 30 is disposed at the lower portion of the front end portion of main frame 31. Thus, driving link 62a of above-described pantograph mechanism 62 is fixed, at a position corresponding to the upper portion of the front end portion of main frame 31, to first sector gear 81 through base pipe 61.

Above-mentioned first coupling member 84L has one end coupled to a portion of second sector gear 82 that is between its tooth surface and sixth rotation axis O6, and the other end coupled to the frontward portion of side frame 32L included in subframe 32 of cushion frame 30 at a position generally above the one end of first coupling member 84L. Thus, first coupling member 84L is located to extend generally in the seat up-down direction (that is, the Z-axis direction).

Above-mentioned second coupling member 85L has one end coupled to a portion of second sector gear 82 that is located opposite to its tooth surface as seen from sixth rotation axis O6, and the other end coupled to the front end portion of side frame 20L included in base frame 20 at a position generally below the one end of second coupling member 85L. Thus, second coupling member 85L is located to extend generally in the seat up-down direction (that is, the Z-axis direction).

Switching from the first usage state shown in FIG. 6 to the second usage state shown in FIG. 7 is performed by operation of the operation unit (not shown) by the occupant of the vehicle to drive the electric motor included in driving unit 7, and the resultant rotation of output shaft 70 by a prescribed amount in a prescribed direction. The direction of rotation of output shaft 70 in this case will be hereinafter referred to as forward direction. This forward direction is a counterclockwise direction in FIGS. 6 and 7.

Referring to FIG. 7, with the rotation of output shaft 70 by the prescribed amount in the forward direction, pinion gear 80 fixed to output shaft 70 also rotates by a prescribed amount in the forward direction about fifth rotation axis O5. Consequently, first sector gear 81 rotates by a prescribed amount in a direction of an arrow A shown in the figure about fourth rotation axis O4, and second sector gear 82 rotates by a prescribed amount in a direction of an arrow B shown in the figure about sixth rotation axis O6.

With the above-mentioned rotation of first sector gear 81, a rotational driving force is input to ottoman frame 60. Specifically, a rotational driving force is input to base pipe 61 and driving link 62a of ottoman frame 60 through pinion gear 80 and first sector gear 81, causing ottoman frame 60 to pivot in a direction of an arrow C shown in the figure about fourth rotation axis O4.

At this time, the rotational driving force is also input to driving link 62a, to expand pantograph mechanism 62 (that is, the pair of left and right crosslink mechanisms 62L and 62R) in a contracted state, causing ottoman frame 60 to deform from the unextended state to the extended state.

By this pivoting and deformation of ottoman frame 60, ottoman 6 moves from the stored position to the used position.

On one hand, with the above-mentioned rotation of second sector gear 82, a rotational driving force is input to subframe 32 of cushion frame 30. Specifically, a rotational driving force is input to subframe 32 through pinion gear 80, second sector gear 82, coupling shaft 83, and first coupling members 84L and 84R, causing subframe 32 to pivot in a direction of an arrow D shown in the figure about second rotation axis O2.

On the other hand, with the above-mentioned rotation of second sector gear 82, a rotational driving force is input to base frame 20, causing a reaction force to this rotational driving force to be input to main frame 31 of cushion frame 30. Specifically, a rotational driving force is input to base frame 20 through pinion gear 80, second sector gear 82, coupling shaft 83, and second coupling members 85L and 85R, causing a reaction force to the rotational driving force that has been input to base frame 20 to be input to main frame 31. Thereby, main frame 31 pivots in a direction of an arrow E shown in the figure about first rotation axis O1.

With this pivoting of main frame 31, the front end portion of subframe 32 pivots such that it is tipped up further, and back frame 40 provided at the rear end portion of main frame 31 pivots such that it is tilted backward.

By the pivoting of cushion frame 30 including these main frame 31 and subframe 32 and the pivoting of back frame 40, seat cushion 3 moves from the first seat position to the second seat position, and seat back 4 moves from the first backrest position to the second backrest position.

While not described in detail, switching from the second usage state shown in FIG. 7 to the first usage state shown in FIG. 6 is performed by operation of the operation unit (not shown) by the occupant of the vehicle to drive the electric motor included in driving unit 7, and the resultant rotation of output shaft 70 by a prescribed amount in a direction reverse to the above-mentioned forward direction. This reverse direction is a clockwise direction in FIGS. 6 and 7.

According to vehicle seat 1A in the present embodiment described above, power transmission mechanism 8 for transmitting a rotational driving force generated at output shaft 70 of driving unit 7 to driving link 62a of pantograph mechanism 62 included in ottoman frame 60 can be configured as a so-called gear mechanism capable of transmitting rotary motion exactly as rotary motion. Thus, not only can the motion transmission efficiency be dramatically increased, but also the installation flexibility of power transmission mechanism 8 can be significantly increased, as compared to an example where power transmission mechanism 8 is configured as a feed screw mechanism. Therefore, vehicle seat 1A can be highly efficient in transmitting a driving force from driving unit 7 to ottoman 6, and have a higher design flexibility than has been conventionally possible.

In addition, according to vehicle seat 1A in the present embodiment, it is possible to cause the main part of vehicle seat 1A (that is, seat cushion 3 and seat back 4) excluding ottoman 6 to pivot in conjunction with the deformation and the pivoting of ottoman 6, by using part of driving unit 7 for driving ottoman 6 and power transmission mechanism 8, without providing a separate driving unit. It is thus possible to perform the deformation and the pivoting of ottoman 6 as well as the pivoting of the main part of above-mentioned vehicle seat 1A by using only single driving unit 7, thereby implementing the complicated operation in vehicle seat 1A by a simple configuration.

In addition, according to vehicle seat 1A in the present embodiment, the front end portion of seat cushion 3 pivots such that it is tipped up during the transition of ottoman 6 from the unextended state to the extended state. Thus, the occurrence of a gap that may be formed between the legs of the occupant of the vehicle and vehicle seat 1A (a gap formed mainly below the knees of the occupant of the vehicle) during the use of ottoman 6 can be suppressed. As a result, not only can the concentration of pressure on seat surface 3a supporting the buttocks of the occupant of the vehicle be reduced to improve ride comfort, but also forward sliding movement of the occupant of the vehicle during deceleration and the like of the vehicle can be suppressed, even if the legs of the occupant of the vehicle are isolated from floor 100 of the vehicle by the use of ottoman 6.

Moreover, according to vehicle seat 1A in the present embodiment, the main part of the vehicle seat including seat cushion 3 and seat back 4 pivots rearward simultaneously with the transition of ottoman 6 from the unextended state to the extended state, causing the front end portion of seat cushion 3 to be tipped up and seat back 4 to be tilted backward. Thus, the occupant of the vehicle can assume a more supine posture while using ottoman 6, thereby realizing a more comfortable posture.

In vehicle seat 1A according to the present embodiment, fifth rotation axis O5 about which output shaft 70 rotates, fourth rotation axis O4 about which first sector gear 81 rotates, and sixth rotation axis O6 about which second sector gear 82 rotates are located flush with one another. Such a configuration can balance a load applied to pinion gear 80 from first sector gear 81 and second sector gear 82, thereby suppressing the occurrence of deformation, breakage and the like of power transmission mechanism 8 including these pinion gear 80, first sector gear 81 and second sector gear 82. By employing this configuration, therefore, the reliability of power transmission mechanism 8 can be significantly increased.

Second Embodiment

Figure 8:
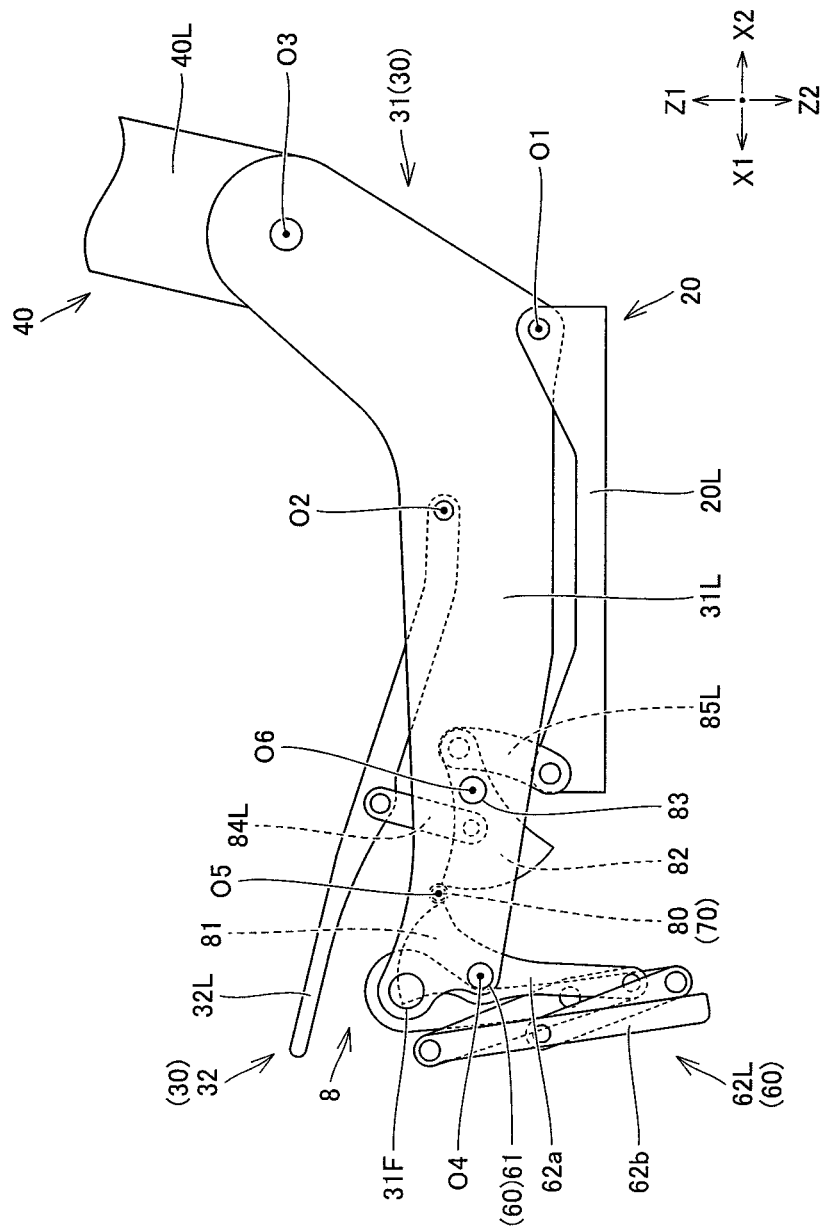
FIG. 8 is a schematic side view showing a state of the framework structure of the main part in the first usage state of a vehicle seat according to a second embodiment.
Figure 9:
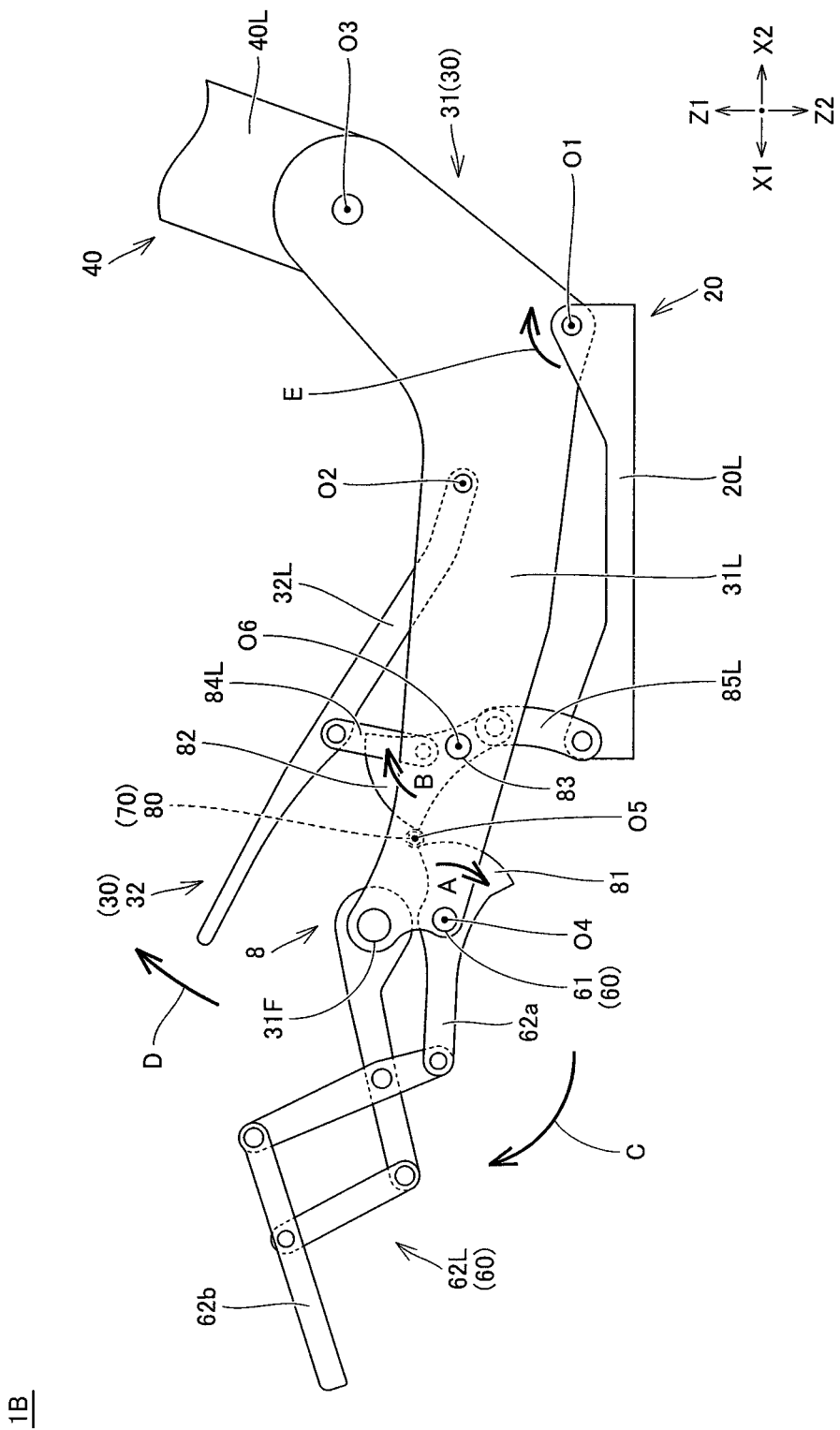
FIG. 9 is a schematic side view showing a state of the framework structure of the main part in the second usage state of the vehicle seat according to the second embodiment.

FIGS. 8 and 9 are schematic side views showing states of the framework structure of the main part in the first and second usage states of a vehicle seat according to a second embodiment, respectively. Referring now to FIGS. 8 and 9, the configuration and operation of a vehicle seat 1B according to the present embodiment will be described. The framework structure of the main part of vehicle seat 1B is shown in a simplified manner in FIGS. 8 and 9.

As shown in FIGS. 8 and 9, vehicle seat 1B according to the present embodiment is different from vehicle seat 1A according to the first embodiment described above mainly in the structure of ottoman frame 60, and the structure of attachment of ottoman frame 60 to cushion frame 30.

Specifically, in vehicle seat 1B according to the present embodiment, front pipe 31F included in main frame 31 of cushion frame 30 is disposed at the upper portion of the front end portion of main frame 31, and base pipe 61 of ottoman frame 60 to which first sector gear 81 is fixed is disposed at the lower portion of the front end portion of main frame 31 of cushion frame 30. Thus, driving link 62a of pantograph mechanism 62 included in ottoman frame 60 is fixed, at a position corresponding to the lower portion of the front end portion of main frame 31, to first sector gear 81 through base pipe 61.

On the other hand, the configuration of driving unit 7 including output shaft 70 (not shown in FIGS. 8 and 9), and the configuration of power transmission mechanism 8 including pinion gear 80, first sector gear 81, second sector gear 82, coupling shaft 83, the pair of first coupling members 84L, 84R and the pair of second coupling members 85L, 85R are both similar to those of vehicle seat 1A according to the first embodiment described above.

Thus, switching from the first usage state shown in FIG. 8 to the second usage state shown in FIG. 9 is implemented by rotation of output shaft 70 and pinion gear 80 fixed thereto by a prescribed amount in the forward direction (counterclockwise direction in FIGS. 8 and 9) about fifth rotation axis O5, and the resultant rotation of first sector gear 81 by a prescribed amount in the direction of arrow A shown in FIG. 9 about fourth rotation axis O4, and the resultant rotation of second sector gear 82 by a prescribed amount in the direction of arrow B shown in FIG. 9 about sixth rotation axis O6.

Specifically, the rotation of first sector gear 81 causes a rotational driving force to be input to ottoman frame 60, causing ottoman frame 60 to pivot in the direction of arrow C shown in FIG. 9 about fourth rotation axis O4, and to deform from the unextended state to the extended state with fourth rotation axis O4 as a base point, with the result that ottoman 6 moves from the stored position to the used position.

In addition, the rotation of second sector gear 82 causes a rotational driving force to be input to subframe 32 of cushion frame 30 and base frame 20, causing subframe 32 to pivot in the direction of arrow D shown in FIG. 9 about second rotation axis O2, and causing main frame 31 to pivot in the direction of arrow E shown in FIG. 9 about first rotation axis O1, with the result that seat cushion 3 moves from the first seat position to the second seat position, and seat back 4 moves from the first backrest position to the second backrest position.

While not described in detail, switching from the second usage state shown in FIG. 9 to the first usage state shown in FIG. 8 is performed by rotation of output shaft 70 and pinion gear 80 fixed thereto by a prescribed amount in a direction reverse to the above-mentioned forward direction. This reverse direction is a clockwise direction in FIGS. 8 and 9.

Vehicle seat 1B according to the present embodiment described above can also produce effects basically similar to those described above in the first embodiment. That is, vehicle seat 1B can be highly efficient in transmitting a driving force from driving unit 7 to ottoman 6 and have a higher design flexibility than has been conventionally possible, improve ride comfort and suppress forward sliding movement of the occupant of the vehicle during deceleration and the like of the vehicle, and furthermore, implement the complicated seat operation by a simple configuration.

Third Embodiment

Figure 10:
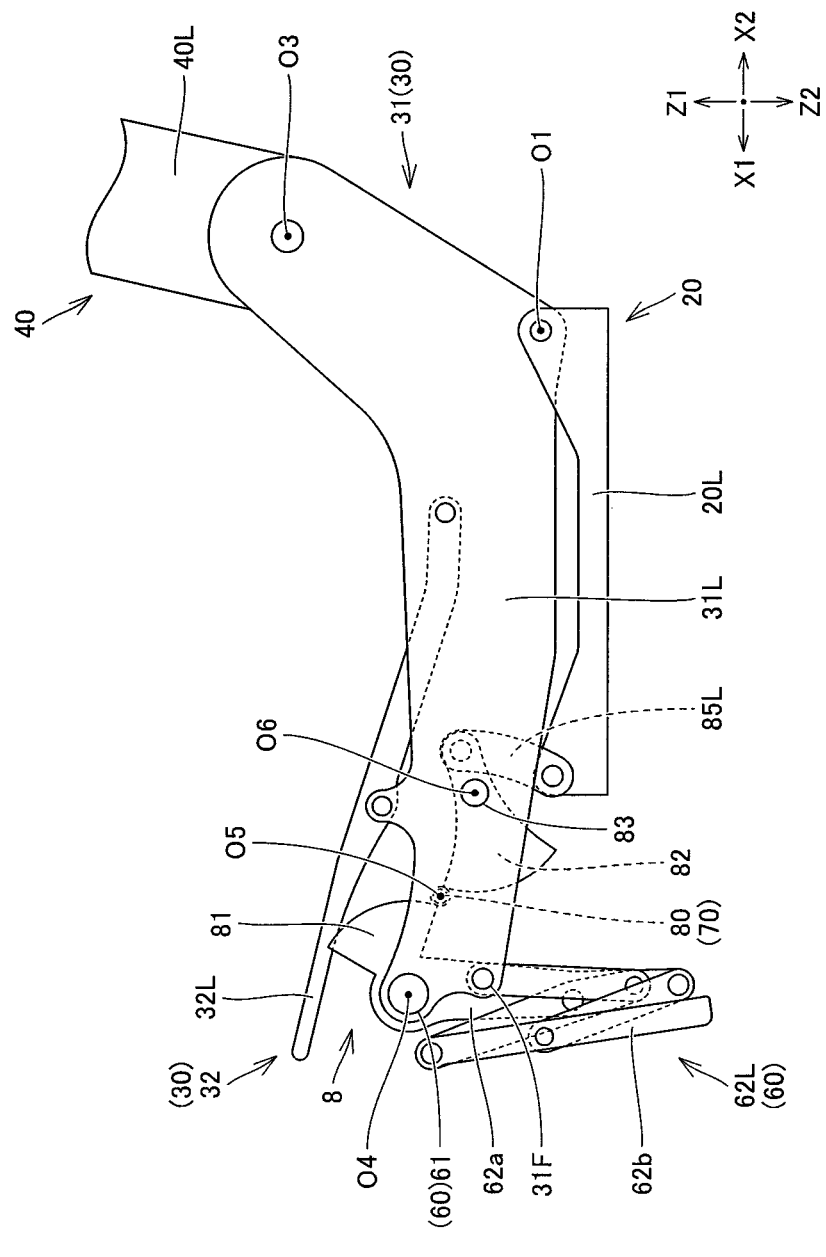
FIG. 10 is a schematic side view showing a state of the framework structure of the main part in the first usage state of a vehicle seat according to a third embodiment.
Figure 11:
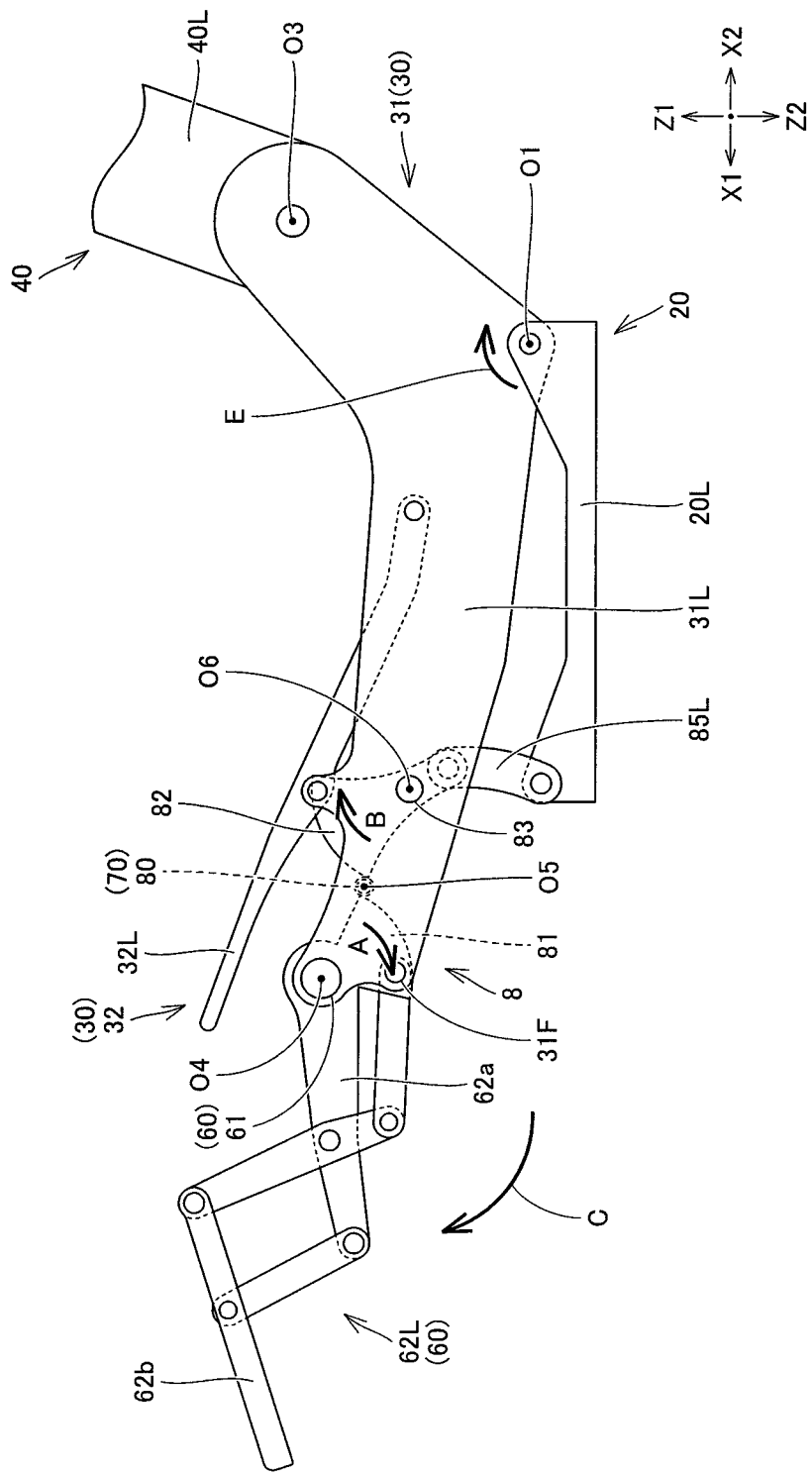
FIG. 11 is a schematic side view showing a state of the framework structure of the main part in the second usage state of the vehicle seat according to the third embodiment.

FIGS. 10 and 11 are schematic side views showing states of the framework structure of the main part in the first and second usage states of a vehicle seat according to a third embodiment, respectively. Referring now to FIGS. 10 and 11, the configuration and operation of a vehicle seat 1C according to the present embodiment will be described. The framework structure of the main part of vehicle seat 1C is shown in a simplified manner in FIGS. 10 and 11.

As shown in FIGS. 10 and 11, vehicle seat 1C according to the present embodiment is different from vehicle seat 1A according to the first embodiment described above mainly in the structure of cushion frame 30 and the structure of power transmission mechanism 8.

Specifically, in vehicle seat 1C according to the present embodiment, although cushion frame 30 has main frame 31 and subframe 32, subframe 32 is not pivotably attached to main frame 31 but is immovably fixed to main frame 31. Consequently, power transmission mechanism 8 is not provided with first coupling member 84L for connecting second sector gear 82 and side frame 32L of subframe 32, and first coupling member 84R paired with this first coupling member 84L.

On the other hand, the configuration of driving unit 7 including output shaft 70 (not shown in FIGS. 10 and 11), and the configuration of power transmission mechanism 8 including pinion gear 80, first sector gear 81, second sector gear 82, coupling shaft 83 and the pair of second coupling members 85L and 85R (that is, the configuration of power transmission mechanism 8 except for the provision of the above-mentioned pair of first coupling members 84L and 84R) are both similar to those of vehicle seat 1A according to the first embodiment described above.

Thus, switching from the first usage state shown in FIG. 10 to the second usage state shown in FIG. 11 is implemented by rotation of output shaft 70 and pinion gear 80 fixed thereto by a prescribed amount in the forward direction (counterclockwise direction in FIGS. 10 and 11) about fifth rotation axis O5, and the resultant rotation of first sector gear 81 by a prescribed amount in the direction of arrow A shown in FIG. 11 about fourth rotation axis O4, and the resultant rotation of second sector gear 82 by a prescribed amount in the direction of arrow B shown in FIG. 11 about sixth rotation axis O6.

Specifically, the rotation of first sector gear 81 causes a rotational driving force to be input to ottoman frame 60, causing ottoman frame 60 to pivot in the direction of arrow C shown in FIG. 11 about fourth rotation axis O4, and to deform from the unextended state to the extended state with fourth rotation axis O4 as a base point, with the result that ottoman 6 moves from the stored position to the used position.

In addition, the rotation of second sector gear 82 causes a rotational driving force to be input to base frame 20, causing main frame 31 to pivot in the direction of arrow E shown in FIG. 11 about first rotation axis O1, with the result that seat cushion 3 moves from the first seat position to the second seat position, and seat back 4 moves from the first backrest position to the second backrest position.

While not described in detail, switching from the second usage state shown in FIG. 11 to the first usage state shown in FIG. 10 is performed by rotation of output shaft 70 and pinion gear 80 fixed thereto by a prescribed amount in a direction reverse to the above-mentioned forward direction. This reverse direction is a clockwise direction in FIGS. 10 and 11.

Vehicle seat 1C according to the present embodiment described above can also produce effects similar to those described above in the first embodiment. That is, vehicle seat 1C can be highly efficient in transmitting a driving force from driving unit 7 to ottoman 6 and have a higher design flexibility than has been conventionally possible, improve ride comfort and suppress forward sliding movement of the occupant of the vehicle during deceleration and the like of the vehicle, and furthermore, implement the complicated seat operation by a simple configuration.

Fourth Embodiment

Figure 12:
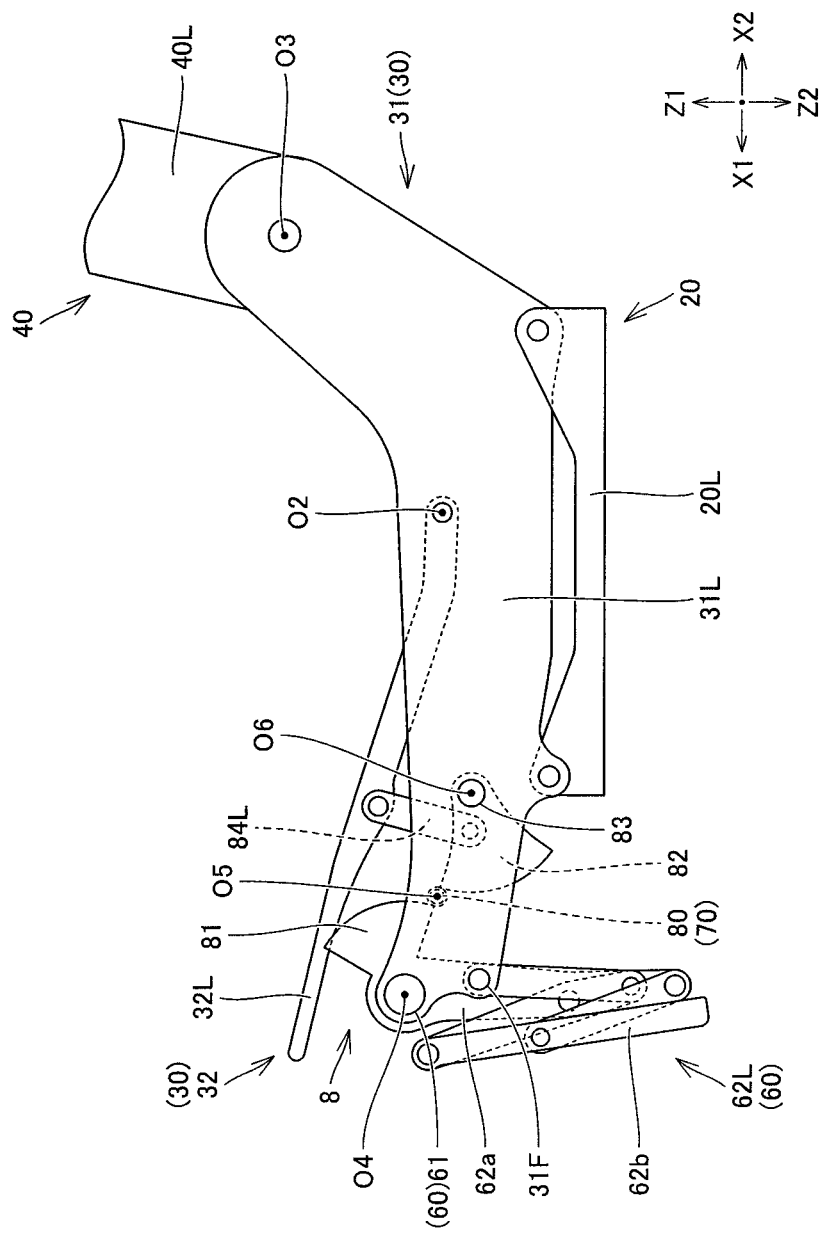
FIG. 12 is a schematic side view showing a state of the framework structure of the main part in the first usage state of a vehicle seat according to a fourth embodiment.
Figure 13:
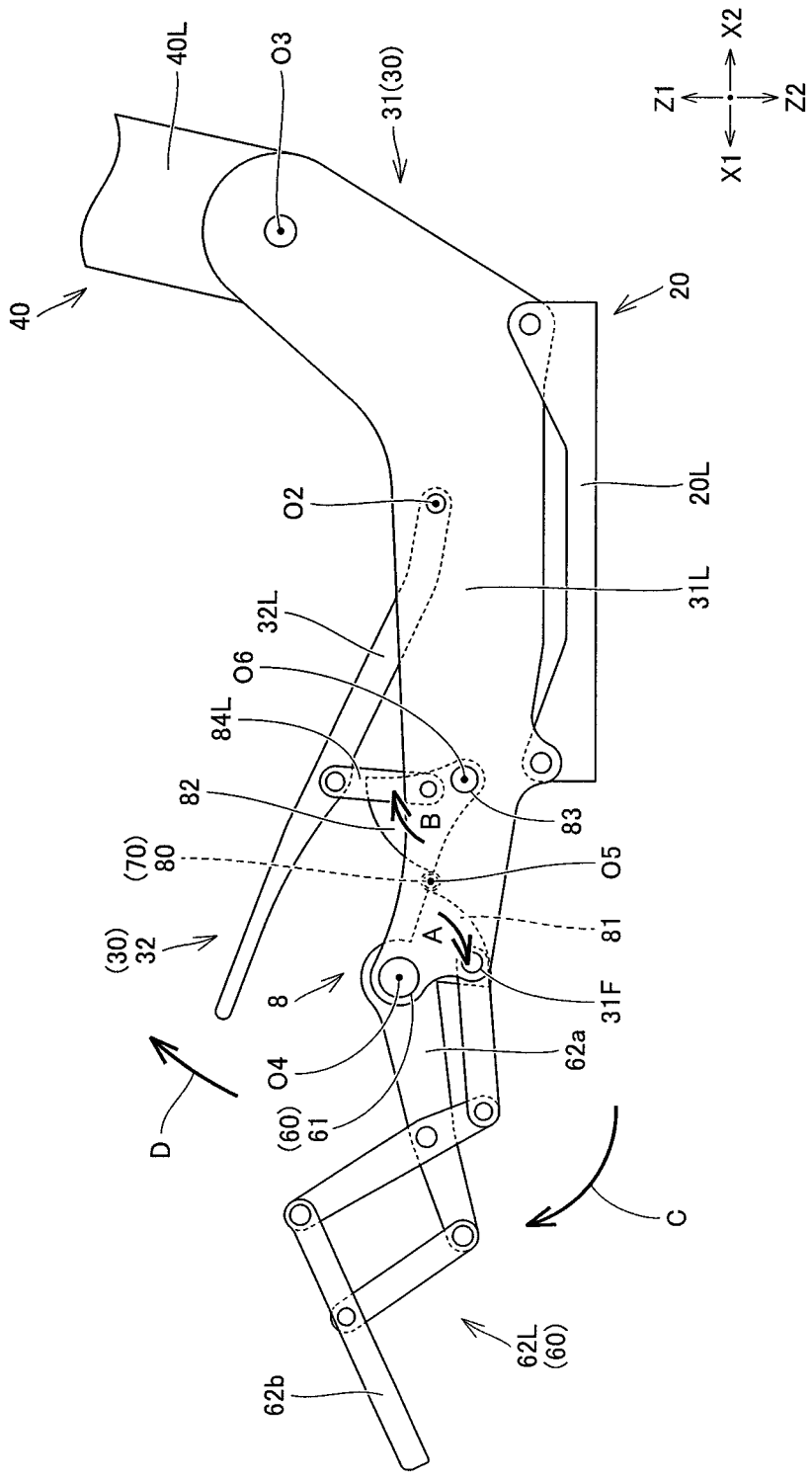
FIG. 13 is a schematic side view showing a state of the framework structure of the main part in the second usage state of the vehicle seat according to the fourth embodiment.

FIGS. 12 and 13 are schematic side views showing states of the framework structure of the main part in the first and second usage states of a vehicle seat according to a fourth embodiment, respectively. Referring now to FIGS. 12 and 13, the configuration and operation of a vehicle seat 1D according to the present embodiment will be described. The framework structure of the main part of vehicle seat 1D is shown in a simplified manner in FIGS. 12 and 13.

As shown in FIGS. 12 and 13, vehicle seat 1D according to the present embodiment is different from vehicle seat 1A according to the first embodiment described above mainly in the structure of attachment of cushion frame 30 to base frame 20 and the structure of power transmission mechanism 8.

Specifically, in vehicle seat 1D according to the present embodiment, main frame 31 of cushion frame 30 is not pivotably attached to base frame 20 but is immovably fixed to base frame 20. Consequently, power transmission mechanism 8 is not provided with second coupling member 85L for connecting second sector gear 82 and side frame 20L of base frame 20, and second coupling member 85R paired with this second coupling member 85L.

On the other hand, the configuration of driving unit 7 including output shaft 70 (not shown in FIGS. 12 and 13), and the configuration of power transmission mechanism 8 including pinion gear 80, first sector gear 81, second sector gear 82, coupling shaft 83 and the pair of first coupling members 84L and 84R (that is, the configuration of power transmission mechanism 8 except for the provision of the above-mentioned pair of second coupling members 85L and 85R) are both similar to those of vehicle seat 1A according to the first embodiment described above.

Thus, switching from the first usage state shown in FIG. 12 to the second usage state shown in FIG. 13 is implemented by rotation of output shaft 70 and pinion gear 80 fixed thereto by a prescribed amount in the forward direction (counterclockwise direction in FIGS. 12 and 13) about fifth rotation axis O5, and the resultant rotation of first sector gear 81 by a prescribed amount in the direction of arrow A shown in FIG. 13 about fourth rotation axis O4, and the resultant rotation of second sector gear 82 by a prescribed amount in the direction of arrow B shown in FIG. 13 about sixth rotation axis O6.

Specifically, the rotation of first sector gear 81 causes a rotational driving force to be input to ottoman frame 60, causing ottoman frame 60 to pivot in the direction of arrow C shown in FIG. 13 about fourth rotation axis O4, and to deform from the unextended state to the extended state with fourth rotation axis O4 as a base point, with the result that ottoman 6 moves from the stored position to the used position.

In addition, the rotation of second sector gear 82 causes a rotational driving force to be input to subframe 32 of cushion frame 30, causing subframe 32 to pivot in the direction of arrow D shown in FIG. 13 about second rotation axis O2, with the result that seat cushion 3 moves from the first seat position to the second seat position. In the present embodiment, since main frame 31 of cushion frame 30 is immovably fixed to base frame 20 as described above, seat back 4 remains disposed at the first backrest position in the second usage state shown in FIG. 13, as in the first usage state shown in FIG. 12.

While not described in detail, switching from the second usage state shown in FIG. 13 to the first usage state shown in FIG. 12 is performed by rotation of output shaft 70 and pinion gear 80 fixed thereto by a prescribed amount in a direction reverse to the above-mentioned forward direction. This reverse direction is a clockwise direction in FIGS. 12 and 13.

Vehicle seat 1D according to the present embodiment described above can also produce effects similar to those described above in the first embodiment. That is, vehicle seat 1D can be highly efficient in transmitting a driving force from driving unit 7 to ottoman 6 and have a higher design flexibility than has been conventionally possible, improve ride comfort and suppress forward sliding movement of the occupant of the vehicle during deceleration and the like of the vehicle, and furthermore, implement the complicated seat operation by a simple configuration.

Fifth Embodiment

Figure 14:
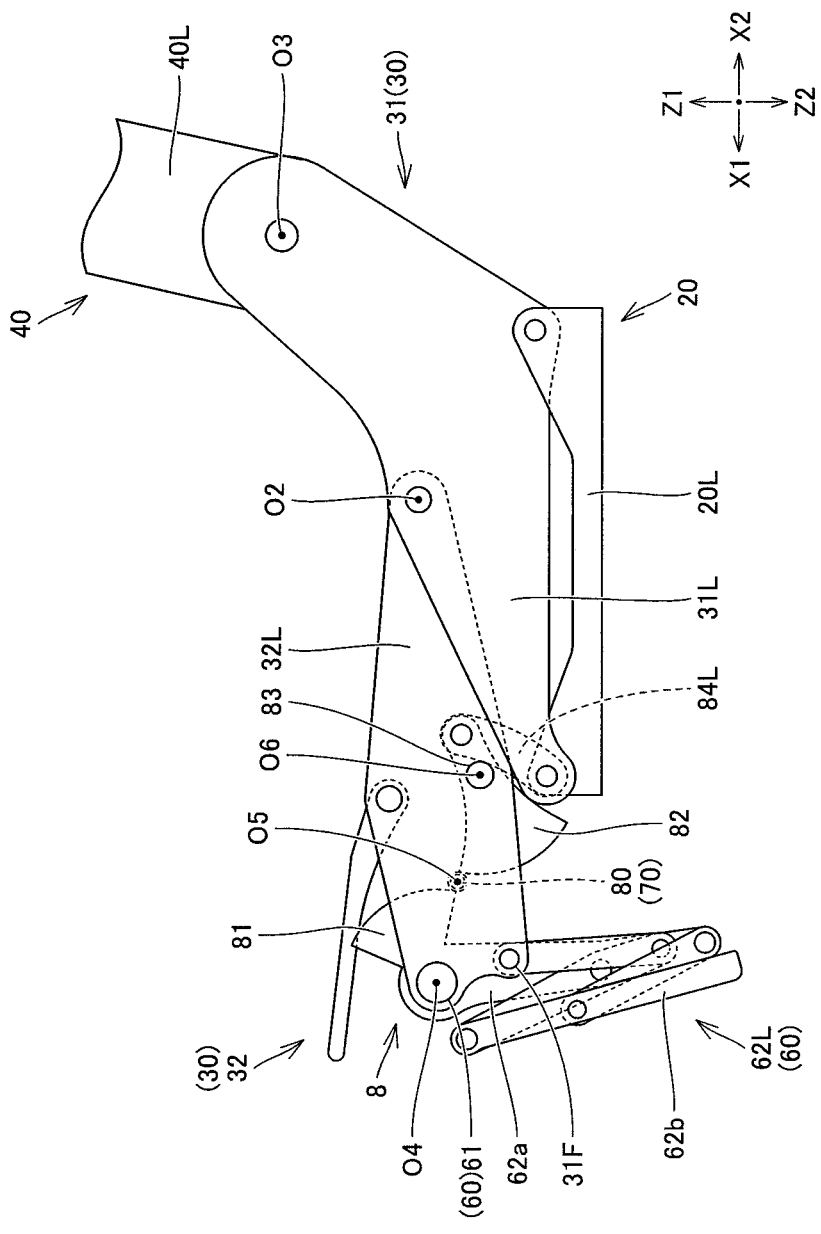
FIG. 14 is a schematic side view showing a state of the framework structure of the main part in the first usage state of a vehicle seat according to a fifth embodiment.
Figure 15:
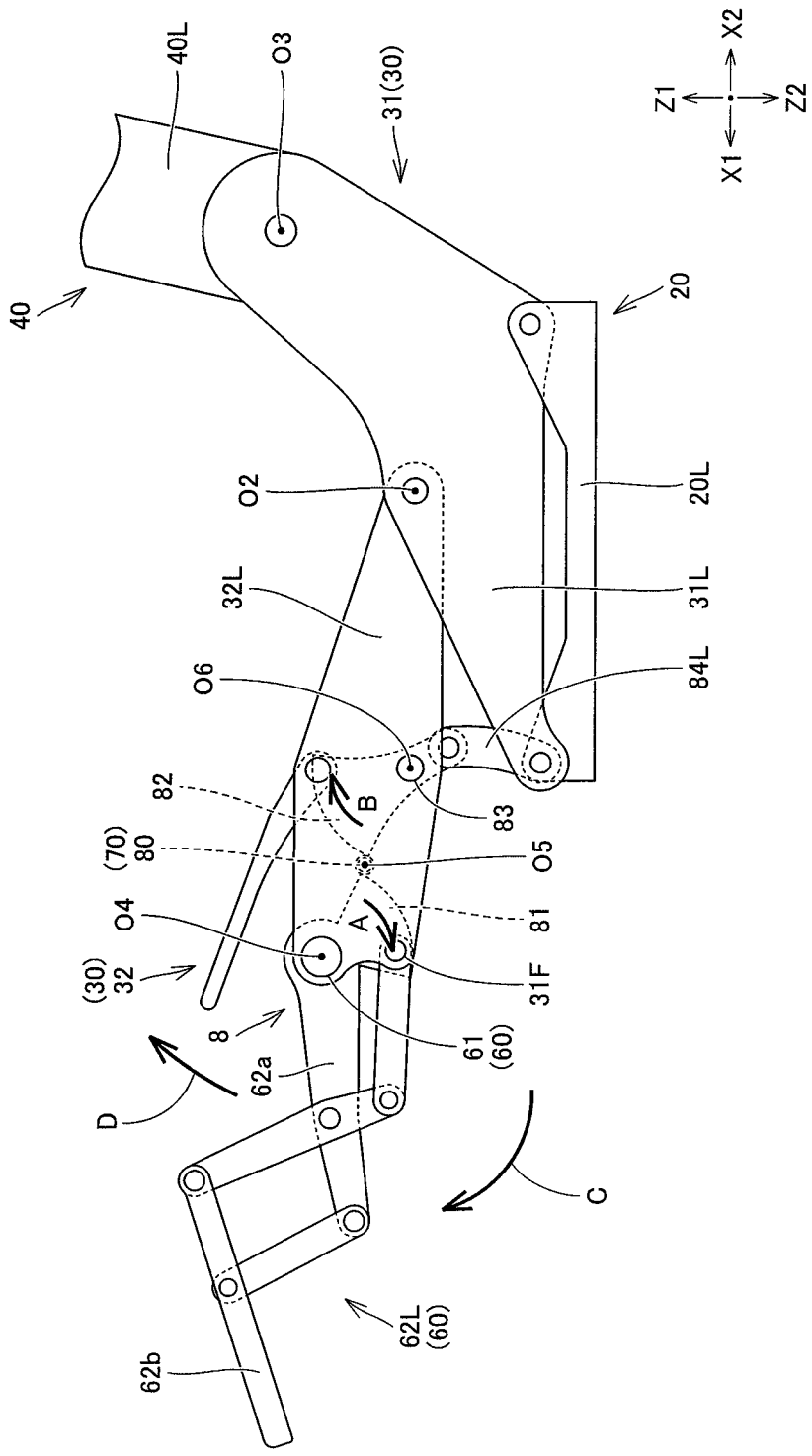
FIG. 15 is a schematic side view showing a state of the framework structure of the main part in the second usage state of the vehicle seat according to the fifth embodiment.

FIGS. 14 and 15 are schematic side views showing states of the framework structure of the main part in the first and second usage states of a vehicle seat according to a fifth embodiment, respectively. Referring now to FIGS. 14 and 15, the configuration and operation of a vehicle seat 1E according to the present embodiment will be described. The framework structure of the main part of vehicle seat 1E is shown in a simplified manner in FIGS. 14 and 15.

As shown in FIGS. 14 and 15, vehicle seat 1E according to the present embodiment is different from vehicle seat 1A according to the first embodiment described above mainly in the structure of cushion frame 30, the structure of attachment of cushion frame 30 to base frame 20, the structure of power transmission mechanism 8, and the structure of attachment of ottoman frame 60 to cushion frame 30.

Specifically, in vehicle seat 1E according to the present embodiment, main frame 31 of cushion frame 30 is not pivotably attached to base frame 20 but is immovably fixed to base frame 20. In addition, ottoman frame 60 is not attached to the front end portion of main frame 31 of cushion frame 30 but is pivotably attached to the front end portion of subframe 32 of cushion frame 30.

Consequently, driving unit 7 (not shown in FIGS. 14 and 15) is provided in the vicinity of the front end portion of subframe 32 of cushion frame 30, and power transmission mechanism 8 is also provided at the front end portion of subframe 32. Thus, each of first sector gear 81, second sector gear 82, coupling shaft 83 and the like of power transmission mechanism 8 is rotatably supported by subframe 32.

In addition, power transmission mechanism 8 is provided with only first coupling member 84L for connecting second sector gear 82 and main frame 31 so as to allow power transmission, and first coupling member 84R paired with this first coupling member 84L, and is not provided with second coupling member 85L for connecting second sector gear 82 and base frame 20, and second coupling member 85R paired with this second coupling member 85L.

On the other hand, the configuration of driving unit 7 including output shaft 70, and the configuration of power transmission mechanism 8 including pinion gear 80, first sector gear 81, second sector gear 82, coupling shaft 83 and the pair of first coupling members 84L and 84R (that is, the configuration of power transmission mechanism 8 except for the provision of the above-mentioned pair of second coupling members 85L and 85R) are both basically similar to those of vehicle seat 1A according to the first embodiment described above.

Thus, switching from the first usage state shown in FIG. 14 to the second usage state shown in FIG. 15 is implemented by rotation of output shaft 70 and pinion gear 80 fixed thereto by a prescribed amount in the forward direction (counterclockwise direction in FIGS. 14 and 15) about fifth rotation axis O5, and the resultant rotation of first sector gear 81 by a prescribed amount in the direction of arrow A shown in FIG. 15 about fourth rotation axis O4, and the resultant rotation of second sector gear 82 by a prescribed amount in the direction of arrow B shown in FIG. 15 about sixth rotation axis O6.

Specifically, the rotation of first sector gear 81 causes a rotational driving force to be input to ottoman frame 60, causing ottoman frame 60 to pivot in the direction of arrow C shown in FIG. 15 about fourth rotation axis O4, and to deform from the unextended state to the extended state with fourth rotation axis O4 as a base point, with the result that ottoman 6 moves from the stored position to the used position.

In addition, the rotation of second sector gear 82 causes a rotational driving force to be input to main frame 31 of cushion frame 30, causing subframe 32 to pivot in the direction of arrow D shown in FIG. 15 about second rotation axis O2, with the result that seat cushion 3 moves from the first seat position to the second seat position. In the present embodiment, since main frame 31 of cushion frame 30 is immovably fixed to base frame 20 as described above, seat back 4 remains disposed at the first backrest position in the second usage state shown in FIG. 15, as in the first usage state shown in FIG. 14.

While not described in detail, switching from the second usage state shown in FIG. 15 to the first usage state shown in FIG. 14 is performed by rotation of output shaft 70 and pinion gear 80 fixed thereto by a prescribed amount in a direction reverse to the above-mentioned forward direction. This reverse direction is a clockwise direction in FIGS. 14 and 15.

Vehicle seat 1E according to the present embodiment described above can also produce effects similar to those described above in the first embodiment. That is, vehicle seat 1E can be highly efficient in transmitting a driving force from driving unit 7 to ottoman 6 and have a higher design flexibility than has been conventionally possible, improve ride comfort and suppress forward sliding movement of the occupant of the vehicle during deceleration and the like of the vehicle, and furthermore, implement the complicated seat operation by a simple configuration.

Other Embodiments

The above-described first to fifth embodiments have been explained with reference to an example of the case where a vehicle seat is provided with, in addition to a pinion gear fixed to an output shaft of a driving unit; a first sector gear used for pivoting and deformation of an ottoman; a second sector gear used for pivoting of a main part of the vehicle seat excluding the ottoman; a coupling shaft; a pair of left and right first coupling members; and a pair of left and right second coupling members, as a power transmission mechanism, but the vehicle seat may be provided with only the above-mentioned pinion gear and first sector gear as the power transmission mechanism. Also in such a case, the vehicle seat can be highly efficient in transmitting a driving force from the driving unit to the ottoman, and have a higher design flexibility than has been conventionally possible.

The above-described first to fifth embodiments have been explained with reference to an example of a vehicle seat including an electrically powered driving unit, but the vehicle seat may instead include a manually operated driving unit. In such a case, the driving unit may be configured such that a rotational driving force is generated at the output shaft through a spring, for example, as a driving source, by operation of the operation unit including the operation lever and the like by the occupant of the vehicle.

Furthermore, the above-described first to fifth embodiments have been explained with reference to an example of the case where the characteristic configuration of the present disclosure is applied to a vehicle seat configured as a seat of an automobile, but the characteristic configuration of the present disclosure is also applicable to any kind of vehicle seat such as a seat installed in a ship, an airplane, an electric train, and the like.

A summary of the present disclosure described above is given as follows.

A vehicle seat according to an aspect of the present disclosure includes: a base to be installed on a floor of a vehicle; a seat cushion provided with a seat surface; an ottoman provided with a leg rest surface; a driving unit provided with an output shaft capable of outputting a rotational driving force in a forward direction and a reverse direction; and a power transmission mechanism that transmits the rotational driving force generated at the output shaft. The seat cushion has a cushion frame formed as a framework of the seat cushion and attached to the base, and the ottoman has an ottoman frame formed as a framework of the ottoman and attached to a front end portion of the cushion frame. The ottoman frame has a pantograph mechanism that allows the ottoman to deform between an extended state and an unextended state, and the ottoman frame is pivotably supported by the cushion frame so as to allow the ottoman to pivot. The power transmission mechanism has a pinion gear fixed to the output shaft, and a first sector gear rotatably supported by the cushion frame and meshing with the pinion gear.

In the vehicle seat according to an aspect of the present disclosure, the first sector gear is connected to a driving link of the pantograph mechanism, so that the rotational driving force generated at the output shaft is input to the driving link by being transmitted through the pinion gear and the first sector gear, and the pivoting and the deformation of the ottoman is performed in response to this input of the rotational driving force to the driving link.

According to such a configuration, the power transmission mechanism for transmitting a rotational driving force generated at the output shaft of the driving unit to the driving link of the pantograph mechanism included in the ottoman frame can be configured as a so-called gear mechanism capable of transmitting rotary motion exactly as rotary motion. Thus, not only can the motion transmission efficiency be dramatically increased, but also the installation flexibility of the power transmission mechanism can be significantly increased, as compared to an example where the power transmission mechanism is configured as a feed screw mechanism. Therefore, the vehicle seat can be highly efficient in transmitting a driving force from the driving unit to the ottoman, and have a higher design flexibility than has been conventionally possible.

The vehicle seat according to an aspect of the present disclosure may be further provided with a configuration of one of first to fourth modes described below.

In the first mode, the cushion frame has a main frame attached to the base and pivotably supporting the ottoman frame, and a subframe attached to the main frame. The main frame is pivotably supported by the base so as to allow a front end portion and a rear end portion of the seat cushion to swing upward and downward, and the subframe is pivotably supported by the main frame so as to allow the front end portion of the seat cushion to swing upward and downward. The first sector gear is rotatably supported by the main frame, and the power transmission mechanism further has a second sector gear rotatably supported by the main frame and meshing with the pinion gear.

In the first mode, the second sector gear is connected to the subframe, so that the rotational driving force generated at the output shaft is input to the subframe by being transmitted through the pinion gear and the second sector gear, and the subframe pivots in response to this input of the rotational driving force to the subframe, causing the upward and downward swing of the front end portion of the seat cushion to be performed, and the second sector gear is connected to the base, so that the rotational driving force generated at the output shaft is input to the base by being transmitted through the pinion gear and the second sector gear, and the main frame pivots in response to a reaction force to this input of the rotational driving force to the base, causing the upward and downward swing of the front end portion and the rear end portion of the seat cushion to be performed.

In the second mode, the cushion frame is pivotably supported by the base so as to allow a front end portion and a rear end portion of the seat cushion to swing upward and downward. The first sector gear is rotatably supported by the cushion frame, and the power transmission mechanism further has a second sector gear rotatably supported by the cushion frame and meshing with the pinion gear.

In the second mode, the second sector gear is connected to the base, so that the rotational driving force generated at the output shaft is input to the base by being transmitted through the pinion gear and the second sector gear, and the cushion frame pivots in response to a reaction force to this input of the rotational driving force to the base, causing the upward and downward swing of the front end portion and the rear end portion of the seat cushion to be performed.

In a third mode, the cushion frame has a main frame attached to the base and pivotably supporting the ottoman frame, and a subframe attached to the main frame. The subframe is pivotably supported by the main frame so as to allow a front end portion of the seat cushion to swing upward and downward. The first sector gear is rotatably supported by the main frame, and the power transmission mechanism further has a second sector gear rotatably supported by the main frame and meshing with the pinion gear.

In the third mode, the second sector gear is connected to the subframe, so that the rotational driving force generated at the output shaft is input to the subframe by being transmitted through the pinion gear and the second sector gear, and the subframe pivots in response to this input of the rotational driving force to the subframe, causing the upward and downward swing of the front end portion of the seat cushion to be performed.

In a fourth mode, the cushion frame has a main frame attached to the base, and a subframe attached to the main frame and pivotably supporting the ottoman frame. The subframe is pivotably supported by the main frame so as to allow a front end portion of the seat cushion to swing upward and downward. The first sector gear is rotatably supported by the subframe, and the power transmission mechanism further has a second sector gear rotatably supported by the subframe and meshing with the pinion gear.

In the fourth mode, the second sector gear is connected to the main frame, so that the rotational driving force generated at the output shaft is input to the main frame by being transmitted through the pinion gear and the second sector gear, and the subframe pivots in response to a reaction force to this input of the rotational driving force to the main frame, causing the upward and downward swing of the front end portion of the seat cushion to be performed.

According to the vehicle seat further provided with a configuration of one of these first to fourth modes, it is possible to cause the main part of the vehicle seat excluding the ottoman to pivot in conjunction with the deformation and the pivoting of the ottoman, by using part of the driving unit for driving the ottoman and the power transmission mechanism, without providing a separate driving unit. It is thus possible to perform the deformation and the pivoting of the ottoman as well as the pivoting of the main part of the above-mentioned vehicle seat by using only a single driving unit, thereby implementing the complicated operation in the vehicle seat by a simple configuration.

In addition, according to the vehicle seat further provided with a configuration of one of these first to fourth modes, the front end portion of the seat cushion pivots such that it is tipped up during the transition of the ottoman from the unextended state to the extended state. Thus, the occurrence of a gap that may be formed between the legs of the user and the vehicle seat (a gap formed mainly below the knees of the user) during the use of the ottoman can be suppressed. As a result, not only can the concentration of pressure on the seat surface supporting the buttocks of the user be reduced to improve ride comfort, but also forward sliding movement of the user during deceleration and the like of the vehicle can be suppressed, even if the legs of the user are isolated from the floor by the use of the ottoman.

Preferably, when provided with a configuration of one of these first to fourth modes, a rotation axis of the output shaft, a rotation axis of the first sector gear, and a rotation axis of the second sector gear are located flush with one another.

Such a configuration can balance a load applied to the pinion gear from the first sector gear and the second sector gear, thereby suppressing the occurrence of deformation, breakage and the like of the power transmission mechanism including these pinion gear, first sector gear and second sector gear. By employing this configuration, therefore, the reliability of the power transmission mechanism can be significantly increased.

The vehicle seat according to an aspect of the present disclosure may further include a seat back provided with a backrest surface. In that case, the seat back may have a back frame formed as a framework of the seat back and attached to a rear end portion of the cushion frame. Also in that case, preferably, the back frame is pivotably supported by the cushion frame so as to allow a tip end portion of the seat back to swing forward and backward.

Such a configuration can cause only the seat back to pivot independently relative to the seat cushion, to allow adjustment of the backrest angle, thereby attaining a comfortable, easy-to-use vehicle seat. When the vehicle seat is further provided with a configuration of one of the first and second modes described above, with the seat back provided at the rear end portion of the seat cushion, the main part of the vehicle seat including the seat cushion and the seat back pivots rearward simultaneously with the transition of the ottoman from the unextended state to the extended state, causing the front end portion of the seat cushion to be tipped up and the seat back to be tilted backward. Thus, the user can assume a more supine posture while using the ottoman, thereby realizing a more comfortable posture.

In the vehicle seat according to an aspect of the present disclosure, the driving unit may have an electric motor for rotating the output shaft.

According to such a configuration, the deformation and the pivoting of the ottoman can both be electrically powered, so that the vehicle seat can be easier to use than when they are manually operated.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle seat comprising:
a base to be installed on a floor of a vehicle;
a seat cushion provided with a seat surface;
an ottoman provided with a leg rest surface;
a driving unit provided with an output shaft capable of outputting a rotational driving force in a forward direction and a reverse direction; and
a power transmission mechanism that transmits the rotational driving force generated at the output shaft,
the seat cushion having a cushion frame formed as a framework of the seat cushion and attached to the base,
the ottoman having an ottoman frame formed as a framework of the ottoman and attached to a front end portion of the cushion frame,
the ottoman frame having a pantograph mechanism that allows the ottoman to deform between an extended state and an unextended state, and being pivotably supported by the cushion frame so as to allow the ottoman to pivot,
the power transmission mechanism having a pinion gear fixed to the output shaft, and a first sector gear rotatably supported by the cushion frame and meshing with the pinion gear, and
the first sector gear being connected to a driving link of the pantograph mechanism, so that the rotational driving force generated at the output shaft is input to the driving link by being transmitted through the pinion gear and the first sector gear, and the pivoting and the deformation of the ottoman is performed in response to this input of the rotational driving force to the driving link.

2. The vehicle seat according to claim 1, wherein
the cushion frame has a main frame attached to the base and pivotably supporting the ottoman frame, and a subframe attached to the main frame,
the main frame is pivotably supported by the base so as to allow a front end portion and a rear end portion of the seat cushion to swing upward and downward,
the subframe is pivotably supported by the main frame so as to allow the front end portion of the seat cushion to swing upward and downward,
the first sector gear is rotatably supported by the main frame,
the power transmission mechanism further has a second sector gear rotatably supported by the main frame and meshing with the pinion gear, and
the second sector gear is connected to the subframe, so that the rotational driving force generated at the output shaft is input to the subframe by being transmitted through the pinion gear and the second sector gear, and the subframe pivots in response to this input of the rotational driving force to the subframe, causing the upward and downward swing of the front end portion of the seat cushion to be performed, and the second sector gear is connected to the base, so that the rotational driving force generated at the output shaft is input to the base by being transmitted through the pinion gear and the second sector gear, and the main frame pivots in response to a reaction force to this input of the rotational driving force to the base, causing the upward and downward swing of the front end portion and the rear end portion of the seat cushion to be performed.

3. The vehicle seat according to claim 2, wherein a rotation axis of the output shaft, a rotation axis of the first sector gear, and a rotation axis of the second sector gear are located flush with one another.

4. The vehicle seat according to claim 1, wherein the cushion frame is pivotably supported by the base so as to allow a front end portion and a rear end portion of the seat cushion to swing upward and downward, the first sector gear is rotatably supported by the cushion frame, the power transmission mechanism further has a second sector gear rotatably supported by the cushion frame and meshing with the pinion gear, and the second sector gear is connected to the base, so that the rotational driving force generated at the output shaft is input to the base by being transmitted through the pinion gear and the second sector gear, and the cushion frame pivots in response to a reaction force to this input of the rotational driving force to the base, causing the upward and downward swing of the front end portion and the rear end portion of the seat cushion to be performed.

5. The vehicle seat according to claim 4, wherein a rotation axis of the output shaft, a rotation axis of the first sector gear, and a rotation axis of the second sector gear are located flush with one another.

6. The vehicle seat according to claim 1, wherein the cushion frame has a main frame attached to the base and pivotably supporting the ottoman frame, and a subframe attached to the main frame, the subframe is pivotably supported by the main frame so as to allow a front end portion of the seat cushion to swing upward and downward, the first sector gear is rotatably supported by the main frame, the power transmission mechanism further has a second sector gear rotatably supported by the main frame and meshing with the pinion gear, and the second sector gear is connected to the subframe, so that the rotational driving force generated at the output shaft is input to the subframe by being transmitted through the pinion gear and the second sector gear, and the subframe pivots in response to this input of the rotational driving force to the subframe, causing the upward and downward swing of the front end portion of the seat cushion to be performed.

7. The vehicle seat according to claim 6, wherein a rotation axis of the output shaft, a rotation axis of the first sector gear, and a rotation axis of the second sector gear are located flush with one another.

8. The vehicle seat according to claim 1, wherein the cushion frame has a main frame attached to the base, and a subframe attached to the main frame and pivotably supporting the ottoman frame, the subframe is pivotably supported by the main frame so as to allow a front end portion of the seat cushion to swing upward and downward, the first sector gear is rotatably supported by the subframe, the power transmission mechanism further has a second sector gear rotatably supported by the subframe and meshing with the pinion gear, and the second sector gear is connected to the main frame, so that the rotational driving force generated at the output shaft is input to the main frame by being transmitted through the pinion gear and the second sector gear, and the subframe pivots in response to a reaction force to this input of the rotational driving force to the main frame, causing the upward and downward swing of the front end portion of the seat cushion to be performed.

9. The vehicle seat according to claim 8, wherein a rotation axis of the output shaft, a rotation axis of the first sector gear, and a rotation axis of the second sector gear are located flush with one another.

10. The vehicle seat according to claim 1, further comprising a seat back provided with a backrest surface, wherein the seat back has a back frame formed as a framework of the seat back and attached to a rear end portion of the cushion frame, and the back frame is pivotably supported by the cushion frame so as to allow a tip end portion of the seat back to swing forward and backward.

11. The vehicle seat according to claim 1, wherein the driving unit has an electric motor for rotating the output shaft.

* * * * *